US012738053B2

(12) United States Patent
Bhatnagar et al.

(10) Patent No.: US 12,738,053 B2
(45) Date of Patent: Sep. 15, 2026

(54) METHOD AND ELECTRONIC DEVICE FOR PROVIDING AUGMENTED REALITY RECOMMENDATIONS

(71) Applicant: SAMSUNG ELECTRONICS CO., LTD., Suwon-si (KR)

(72) Inventors: Shefali Bhatnagar, Noida (IN); Akansha Sharma, Noida (IN); Amit Singh Bhadauria, Noida (IN); Pulkit Agarawal, Noida (IN); Vishnu Kumar Dwivedi, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/071,968

(22) Filed: Nov. 30, 2022

(65) Prior Publication Data

US 2023/0186624 A1 Jun. 15, 2023

Related U.S. Application Data

(63) Continuation of application No. PCT/KR2022/013405, filed on Sep. 7, 2022.

(30) Foreign Application Priority Data

Dec. 14, 2021 (IN) ............................ 202141058094

(51) Int. Cl.
*G06T 11/00* (2026.01)
*G06F 3/0482* (2013.01)
(Continued)

(52) U.S. Cl.
CPC ............ *G06V 20/20* (2022.01); *G06F 3/0482* (2013.01); *G06F 9/451* (2018.02); *G06T 11/00* (2013.01); *G06V 10/764* (2022.01)

(58) Field of Classification Search
None
See application file for complete search history.

(56) References Cited

U.S. PATENT DOCUMENTS 9,690,457 B2 6/2017 Levien et al.
9,905,128 B2 2/2018 Yoon et al.
(Continued)

FOREIGN PATENT DOCUMENTS

JP 2018-116515 A 7/2018
KR 10-1925181 B1 12/2018

OTHER PUBLICATIONS

International Search Report and Written Opinion (PCT/ISA/210 and PCT/ISA/237) dated Apr. 13, 2023, issued by International Searching Authority for International Application No. PCT/KR2022/013405.

(Continued)

*Primary Examiner* — Sultana M Zalalee
(74) *Attorney, Agent, or Firm* — Sughrue Mion, PLLC

(57) ABSTRACT

A method for providing augmented reality (AR) recommendations to a user by an electronic device include displaying, by the electronic device, an image on a screen of the electronic device, identifying, by the electronic device, at least one real world object in the image, determining, by the electronic device, at least one function of at least one application installed in the electronic device based on the at least one identified real world object, and augmenting, by the electronic device, the at least one function of the at least one application as an AR recommendation over the image.

15 Claims, 31 Drawing Sheets

(51) Int. Cl.
*G06F 9/451* (2018.01)
*G06V 10/764* (2022.01)
*G06V 20/20* (2022.01)

(56) References Cited

U.S. PATENT DOCUMENTS 10,089,791 B2 10/2018 Mullins
10,091,322 B2 10/2018 O'Donoghue et al.
10,229,312 B2 3/2019 Barnett et al.
10,360,734 B2 7/2019 Drouin et al.
10,540,378 B1 * 1/2020 Hsiao ...................... G06F 18/24
10,924,651 B2 2/2021 Chaudhri et al.
11,145,122 B2 10/2021 Kollencheri Puthenveettil
11,170,222 B2 11/2021 Kim et al.
11,199,906 B1 * 12/2021 Curtis ................... G06F 1/1626
11,210,730 B1 * 12/2021 Woodyard ........... G07G 1/0063
2006/0271618 A1 * 11/2006 Kokubo ............ H04M 1/72454 709/202
2013/0007662 A1 * 1/2013 Bank ........................ G06F 9/451 715/811
2013/0051615 A1 * 2/2013 Lim ................... G06Q 30/0261 382/103
2013/0144674 A1 * 6/2013 Kim ................... G06Q 30/0267 705/7.19
2014/0075328 A1 * 3/2014 Hansen .................. G06Q 10/04 715/747
2014/0181749 A1 * 6/2014 Takikawa ............. G06F 3/0482 715/835
2014/0298383 A1 10/2014 Jo et al.
2015/0294503 A1 10/2015 Yang et al.
2017/0053444 A1 * 2/2017 Huang ................... B60K 35/10
2017/0085519 A1 * 3/2017 Skinner ................... H04L 51/52
2017/0147581 A1 * 5/2017 Srinivasan ........ G06F 16/24578
2018/0181997 A1 * 6/2018 Sanjeevaiah Krishnaiah .............. H04L 67/53
2018/0203707 A1 * 7/2018 Abadi .................. G06F 9/4451
2018/0246983 A1 * 8/2018 Rathod ................. G06F 16/972
2018/0285852 A1 * 10/2018 Matsui ..................... G07G 1/12
2018/0314889 A1 * 11/2018 Fukazawa ............... G06F 3/038
2018/0336415 A1 * 11/2018 Anorga .................. G06N 20/00
2019/0147741 A1 * 5/2019 Rosas-Maxemin .......................... G08G 1/096888 701/425
2019/0379620 A1 * 12/2019 Cheng ................ G06Q 30/0252
2020/0193163 A1 * 6/2020 Chang ................ H04N 21/4662
2020/0272913 A1 * 8/2020 Yu ............................ G06N 7/01
2020/0302310 A1 * 9/2020 Woiceshyn .......... G06K 7/1413
2020/0344411 A1 * 10/2020 Cragg .................... H04N 23/64
2020/0396305 A1 12/2020 Gupta
2020/0401912 A1 * 12/2020 Sert ........................ G06N 20/00
2020/0410720 A1 12/2020 Jagnow et al.
2021/0241537 A1 8/2021 Ahn
2021/0264673 A1 8/2021 Jung
2021/0295602 A1 * 9/2021 Scapel ................ G06F 3/04815
2022/0076489 A1 * 3/2022 Mishra ................... G06V 20/00
2022/0101361 A1 * 3/2022 Drummond ........... G06T 19/006
2022/0414403 A1 * 12/2022 Hlavac .................... G06F 3/011

OTHER PUBLICATIONS

Examination report issued on May 24, 2024 by the India Patent Office for Indian Patent Application No. 202141058094.
Extended European Search Report mailed on Jul. 23, 2024 by the European Patent Office for European Patent Application No. 22907620.3.
Communication issued on Mar. 18, 2026 by the Indian Patent Office in corresponding IN Patent Application No. 202141058094.
Communication dated Jul. 3, 2026, issued by the European Patent Office in European Application No. 22907620.3.

* cited by examiner

| Fetched Object vs BII Mapping | | |
|---|---|---|
| Object class | BII | Intention/BII category |
| Family & Kids | Create call | Communication |
| | Get Offer | Shopping |
| | Get Product | Shopping |
| Cutlery | Order menu item | Food and drink |
| | Get reservation | Travel |
| Furniture | Get Product | Shopping |
| Sports equipment | Get News article | Common |
| Pet | Get Product | Shopping |
| | Get Thing | Common |

FIG. 11B

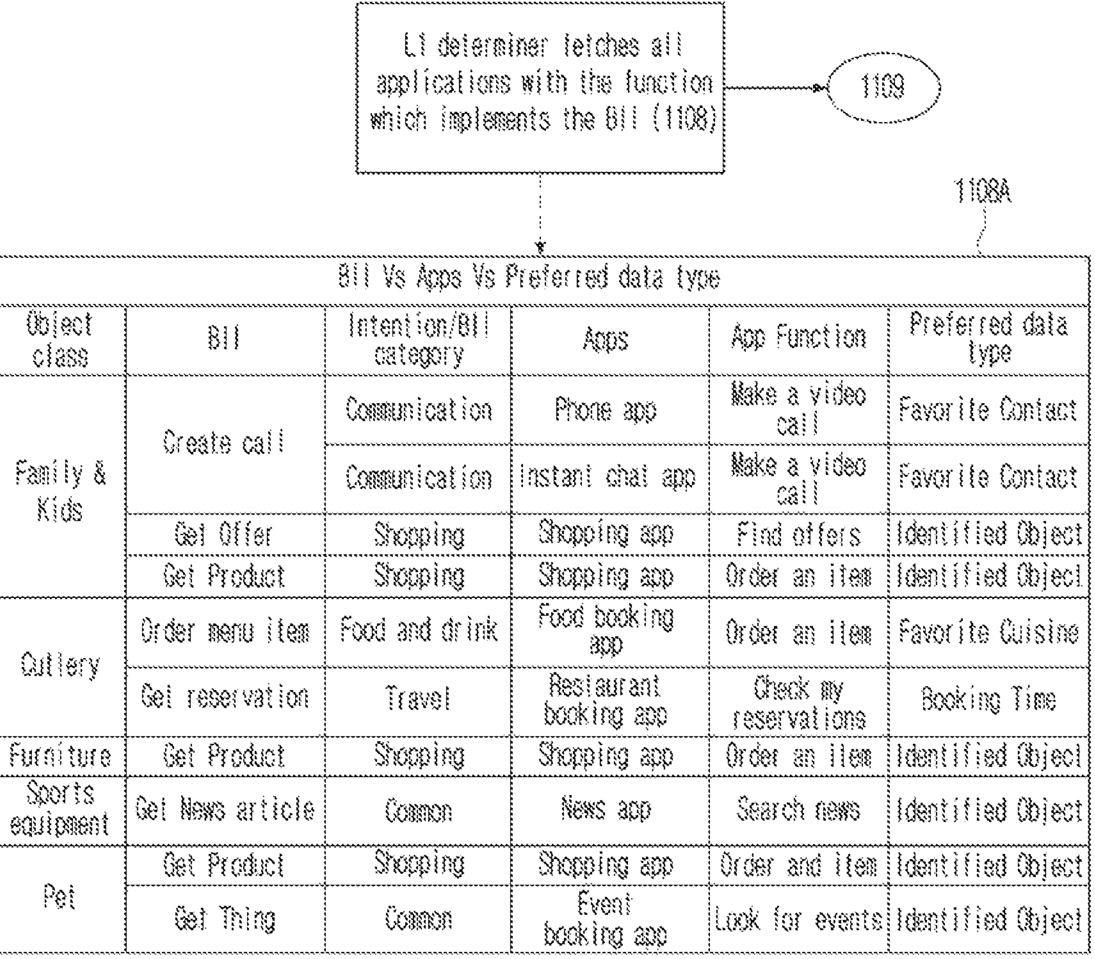

| BII Vs Apps Vs Preferred data type | | | | | |
|---|---|---|---|---|---|
| Object class | BII | Intention/BII category | Apps | App Function | Preferred data type |
| Family & Kids | Create call | Communication | Phone app | Make a video call | Favorite Contact |
| | | Communication | Instant chat app | Make a video call | Favorite Contact |
| | Get Offer | Shopping | Shopping app | Find offers | Identified Object |
| | Get Product | Shopping | Shopping app | Order an item | Identified Object |
| Cutlery | Order menu item | Food and drink | Food booking app | Order an item | Favorite Cuisine |
| | Get reservation | Travel | Restaurant booking app | Check my reservations | Booking Time |
| Furniture | Get Product | Shopping | Shopping app | Order an item | Identified Object |
| Sports equipment | Get News article | Common | News app | Search news | Identified Object |
| Pet | Get Product | Shopping | Shopping app | Order and item | Identified Object |
| | Get Thing | Common | Event booking app | Look for events | Identified Object |

FIG. 11C

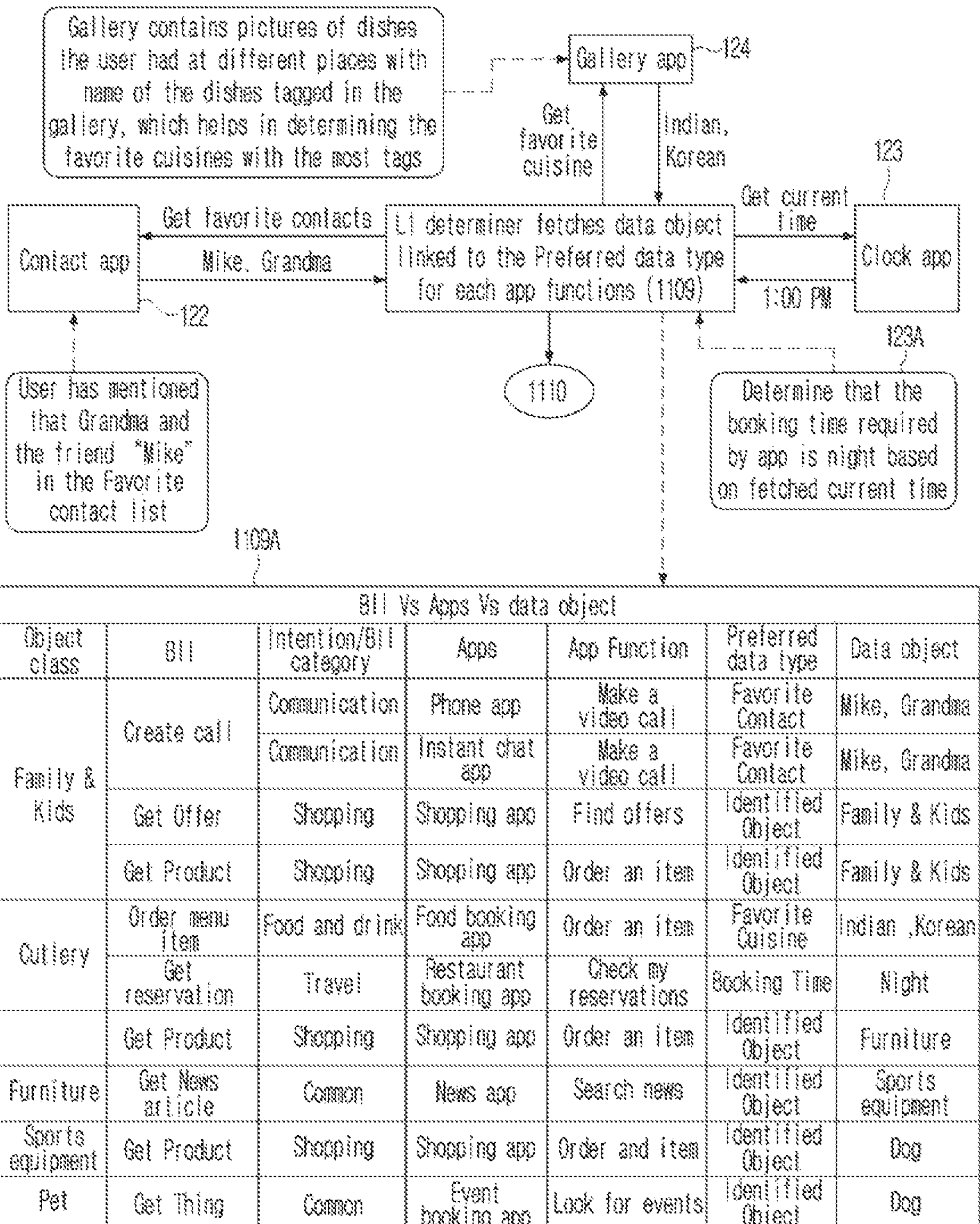

| BII Vs Apps Vs data object | | | | | | |
|---|---|---|---|---|---|---|
| Object class | BII | Intention/BII category | Apps | App Function | Preferred data type | Data object |
| Family & Kids | Create call | Communication | Phone app | Make a video call | Favorite Contact | Mike, Grandma |
| | | Communication | Instant chat app | Make a video call | Favorite Contact | Mike, Grandma |
| | Get Offer | Shopping | Shopping app | Find offers | Identified Object | Family & Kids |
| | Get Product | Shopping | Shopping app | Order an item | Identified Object | Family & Kids |
| Cutlery | Order menu item | Food and drink | Food booking app | Order an item | Favorite Cuisine | Indian ,Korean |
| | Get reservation | Travel | Restaurant booking app | Check my reservations | Booking Time | Night |
| | Get Product | Shopping | Shopping app | Order an item | Identified Object | Furniture |
| Furniture | Get News article | Common | News app | Search news | Identified Object | Sports equipment |
| Sports equipment | Get Product | Shopping | Shopping app | Order and item | Identified Object | Dog |
| Pet | Get Thing | Common | Event booking app | Look for events | Identified Object | Dog |

FIG. 11D

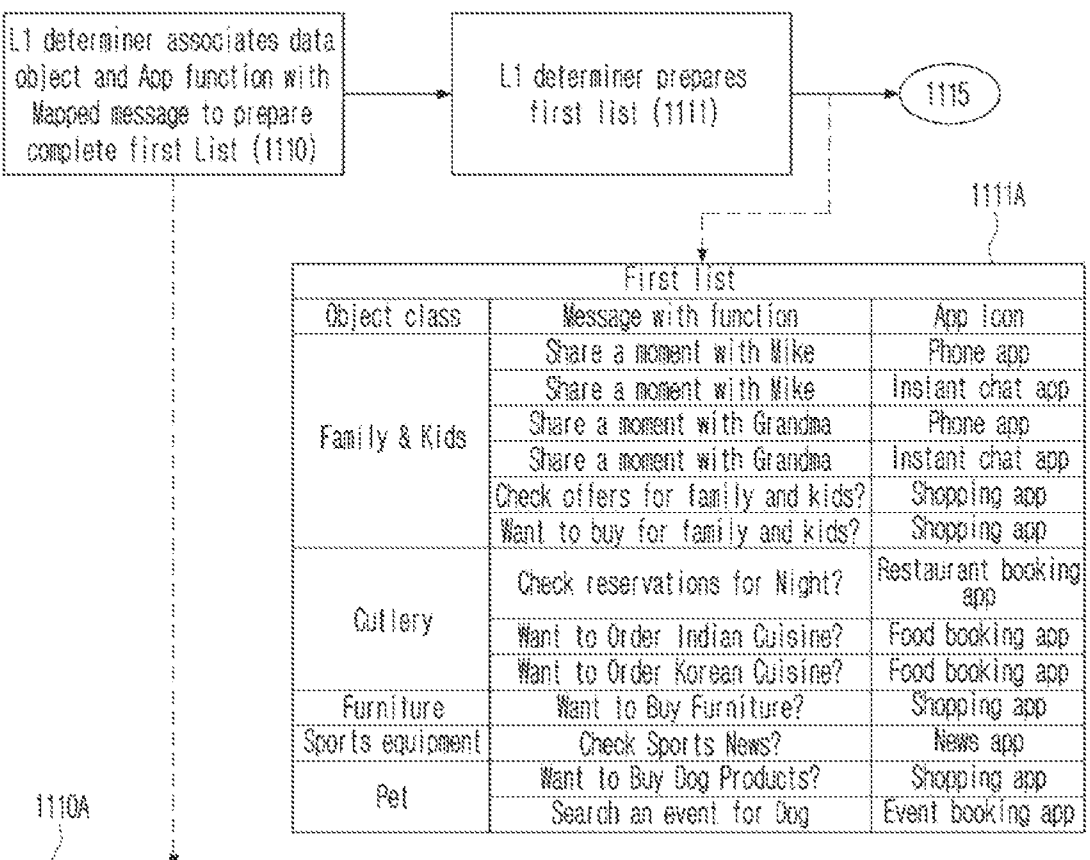

| First list | | |
|---|---|---|
| Object class | Message with function | App icon |
| Family & Kids | Share a moment with Mike | Phone app |
| | Share a moment with Mike | Instant chat app |
| | Share a moment with Grandma | Phone app |
| | Share a moment with Grandma | Instant chat app |
| | Check offers for family and kids? | Shopping app |
| | Want to buy for family and kids? | Shopping app |
| Cutlery | Check reservations for Night? | Restaurant booking app |
| | Want to Order Indian Cuisine? | Food booking app |
| | Want to Order Korean Cuisine? | Food booking app |
| Furniture | Want to Buy Furniture? | Shopping app |
| Sports equipment | Check Sports News? | News app |
| Pet | Want to Buy Dog Products? | Shopping app |
| | Search an event for Dog | Event booking app |

| BII Vs Apps Vs Associated Data Vs Mapped Message | | | | | |
|---|---|---|---|---|---|
| Object class | BII | Apps | App Function | data object | Mapped Messages |
| Family & Kids | Create call | Phone app | Make a video call | Mike, Grandma | Share a moment |
| | | Instant chat app | Make a video call | Mike, Grandma | Share a moment |
| | Get Offer | Shopping app | Find offers | Family & Kids, | Check offers |
| | Get Product | Shopping app | Order an item | Family & Kids | Want to Buy? |
| Cutlery | Order menu item | Food booking app | Order an item | Indian ,Korean | Want to Order? |
| | Get reservation | Restaurant booking app | Check my reservations | Night | Check reservations? |
| Furniture | Get Product | Shopping app | Order an item | Furniture | Want to Buy? |
| Sports equipment | Get News article | News app | Search news | Sports equipment | Check News? |
| Pet | Get Product | Shopping app | Order an item | Dog | Want to Buy? |
| | Get Thing | Event booking app | Look for events | Dog | Search an event? |

| Object | Object ID |
|---|---|
| Lamp | 1 |
| Book | 2 |
| Lady | 3 |
| Flower pot | 4 |
| Window | 5 |

| Applications | Functions | Object ID |
|---|---|---|
| UC | Book Window Painting | 5 |
| | Book Sun Glasses | 3 |
| | Search eBook | 2 |
| | Buy New Curtains | 4 |
| | Order Toys | 3 |
| Book my show | Get ticket for Book Fair | 2 |
| | Check To-Do reminders | All Object IDs |
| | Change Brightness Level | 1 |
| | Buy New Book | 2 |
| audible | Renew subscription | 2 |
| | Buy New dress | 3 |
| fernsnpetals | Order Seeds | 4 |
| | Order Flowers | 4 |
| | Book Dry Cleaning | 5 |
| | Open/Close Curtain | 5 |
| practo | Book Medical Checkup | 3 |
| | Pay Electricity Bill | 1 |

| Augmented Context | Message with function from first list | | Yes/No class |
|---|---|---|---|
| Augmented Lamp | Change Brightness Level | AI Model 115 | Yes class |
| | Pay Electricity Bill | | Yes class |
| | Check To-Do reminders | | Yes class |
| Augmented Book | Search eBook | | No class |
| | Get ticket for Book Fair | | Yes class |
| | Renew subscription | | Yes class |
| Augmented Flower Pot | Order Flowers | | Yes class |
| | Order Seeds | | No class |
| Augmented Lady | Book Sun Glasses | | No class |
| | Buy New dress | | No class |
| | Book Medical Checkup | | No class |
| Augmented Window | Book Window Painting | | No class |
| | Buy New Curtains | | Yes class |
| | Book Dry Cleaning | | No class |
| | Open/ Close Curtain | | No class |
| | Check To-Do reminders | | No class |

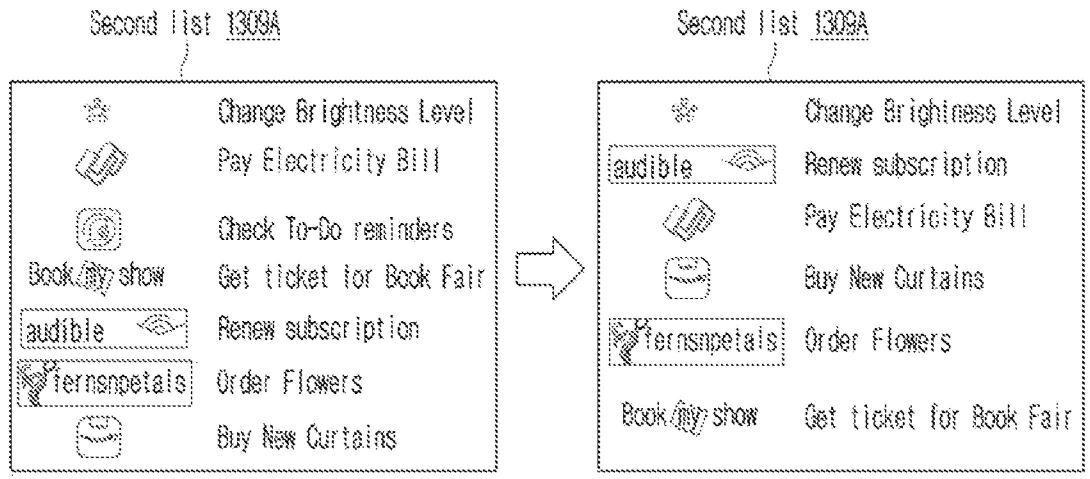

METHOD AND ELECTRONIC DEVICE FOR PROVIDING AUGMENTED REALITY RECOMMENDATIONS

CROSS-REFERENCE TO RELATED APPLICATION

This application is a bypass continuation of International Application No. PCT/KR2022/013405, filed on Sep. 7, 2022, which is based on and claims priority to India Patent Application No. 202141058094, filed on Dec. 14, 2021, in the Intellectual Property Office of India, the disclosures of which are incorporated by reference herein in their entireties.

BACKGROUND

1. Field

The disclosure relates generally to an electronic device, and more specifically to a method and the electronic device for providing Augmented Reality (AR) recommendations to a user.

2. Description of Related Art

A virtual assistant device generally provides recommendations such as traffic in a road through which a user wants to travel, an operating condition of a smart appliance in a home of the user, climatic condition in a place where the user wants to visit, scheduled reminders, etc., to the user for helping the user to perform daily tasks. In order to provide such recommendations, the virtual assistant device may learn context of the user such as likes and dislikes of the user. Learning of the context of the user is an indefinite task to the virtual assistant device, For example, the likes and dislikes of the user vary in various scenarios. The user may wish to see the recommendations only when the user is not busy with some activities. As shown in 11 of FIG. 1, a user 10 is driving a car 20, and the virtual assistant device suggests a few recommendations to the user 10 without knowing the likes and dislikes of the user. The user 10 is busy in driving the car 20, and hence the user 10 ignores the recommendations. As shown in 12 of the FIG. 1 the user 10 stepped out of the car 20, and the user 10 is available to check the recommendations after leaving the car 20. However, the virtual assistant device does not suggest the recommendations to the user 10 even the user 10 is available since the user 10 ignores the recommendations while driving the car 20.

As shown in 13 of FIG. 2 the user 10 is reading a book 40, and a smartphone 30 (i.e. virtual assistant device) kept near to the user 10 suggests a reminder to the user 10 for calling a friend. The user 10 is busy in reading the book 40, and hence the user 10 ignores the reminder. As shown in 14 of FIG. 2, the user 10 has closed the book 40 and taken the smartphone 30 for browsing, and the user 10 is available to check the reminder in the smartphone 30. However, the virtual assistant device does not suggest the reminder to the user 10 even the user 10 is available since the user 10 ignores the reminder while reading the book 40. Thus, the user 10 has missed knowing about the recommendations which significantly degrades a user experience. Thus, it is desired at least provide a useful alternative for intelligently providing the recommendations to the user 10.

SUMMARY

Provided is a method and an electronic device for providing augmented reality (AR) recommendations to a user. While displaying an image including real world objects, the electronic device discovers a relationship between functions of an application with the real world objects. Further, the electronic device augments the functions of the application having the relationship with the real world objects as the AR recommendations over the image. Examples of the functions of the application include an instant chat message to be send to a friend, an online purchase of a laptop, a reminder set for office call, a data object (e.g. documents, music, video, etc.) stored in the electronic device, etc. The user can quickly relate the AR recommendations with the real world objects while viewing the AR recommendations. Further, the user can take a quick action by selecting the AR recommendations that are appropriate for the user, which improves a user experience in handling recommendations generated by the electronic device.

Provided is a serendipity experience to the user in viewing suggestion/reminders/data-objects while watching a video/photo and capturing/previewing an image of a scene. Since the AR recommendations are overlaying on the displayed image of the video/photo/scene, the user need not spend a dedicated amount of time for viewing the recommendations generated by the electronic device, which helps the user to save a significant amount of time. Since the user is getting unexpected and important recommendations while performing other tasks using the electronic device (e.g. smartphone), the method ensures that the user will not miss reminders. The method uses a general human behaviors reminding of something related to that object when seeing the object.

Additional aspects will be set forth in part in the description which follows and, in part, will be apparent from the description, or may be learned by practice of the presented embodiments.

According to an aspect of the disclosure, a method for providing actionable content in an electronic device may include receiving, by the electronic device, an image from at least one of a gallery and a camera of the electronic device, extracting, by the electronic device, scene information by analyzing a scene from the received image, identifying, by the electronic device, at least one object from the scene information, determining, by the electronic device, at least one scene description, displaying, by the electronic device, a serendipity mode over the image, identifying, by the electronic device, a user's input selecting the serendipity mode, extracting, by the electronic device, a list of application functions based on the at least one object, filtering, by the electronic device, application functions from the list of application functions based on the at least one scene description and a user state, prioritizing, by the electronic device, the filtered application functions based on a usage history, displaying, by the electronic device, the prioritized filtered application functions for the at least one object, and launching, by the electronic device, an application function based on a user's selection from the displayed filtered application functions for the at least one object.

The filtered application functions may be arranged in a descending order of priority, and the user state may include a temporal context, a spatial context, a network context, and a physiological context of a user.

Filtering the application functions may include generating, by the electronic device, at least one augmented context based on the at least one scene description and the user state, where the at least one augmented context indicates an overall digital representation of the scene with respect to the at least one object in the scene and the user state while viewing the scene, and filtering, by the electronic device, the application functions from the list of application functions by applying the at least one augmented context to an artificial intelligence (AI) model.

Displaying the filtered application functions for the at least one object may include augmenting, by the electronic device, the filtered application functions as an augmented reality (AR) recommendation over the image, where the AR recommendation may be configured to trigger the filtered application functions, a size of the AR recommendation may be varied based on the priority of the launched application function, and a position of the AR recommendation may be rendered based on a position of the at least one object in the image.

According to an aspect of the disclosure, a method for providing AR recommendations to a user by an electronic device may include displaying, by the electronic device, an image on a screen of the electronic device, identifying, by the electronic device, at least one real world object in the image, determining, by the electronic device, at least one function of at least one application installed in the electronic device based on the at least one identified real world object, and augmenting, by the electronic device, the at least one function of the at least one application as an AR recommendation over the image.

Determining the at least one function of the at least one application installed in the electronic device may include determining, by the electronic device, an identifier of the at least one identified real world object, matching, by the electronic device, the identifier of the at least one identified real world object with a predefined set of identifiers embedded with the at least one application, and fetching, by the electronic device, the at least one function of the at least one application based on a match between the identifier of the at least one identified real world object and the predefined set of identifiers.

Augmenting the at least one function of the at least one application may include classifying, by the electronic device, the at least one identified real world object to one or more object classes based on an attribute of the at least one identified real world object, determining, by the electronic device, an intention of each function of the at least one application for each object class, identifying, by the electronic device, a preferred data type linked to the intention of each function of the at least one application for each object class, fetching, by the electronic device, data objects linked to the preferred data type, fetching, by the electronic device, a message content mapped to each function of the at least one application, generating, by the electronic device, a first list of messages with corresponding functions of the at least one application based on the mapped message content and the data objects for each object class, determining, by the electronic device, a context of a scene in the image, where the context of the scene includes an activity performed on each object class and an activity performed by each object class, determining, by the electronic device, a context of the user of the electronic device in real time, where the context of the user includes a temporal context, a spatial context, a network context, and a physiological context of the user, generating, by the electronic device, at least one augmented context based on the context of the scene, and the context of the user for each object class, where the at least one augmented context indicates an overall digital representation of the scene with respect to the at least one real world object in the scene and a user state while viewing the scene, filtering, by the electronic device, a second list of messages with corresponding functions of the at least one application from the first list of messages for each object class by applying the at least one augmented context to an AI model, determining, by the electronic device, a priority of functions of the at least one application corresponding to the second list of messages based on a historical usage frequency of the functions of the at least one application, filtering, by the electronic device, a third list of messages with corresponding functions of the at least one application from the second list of messages for each object class based on the priority of the functions of the at least one application corresponding to the second list of messages, and augmenting, by the electronic device, each message in the third list of messages as the AR recommendation over the image. The AR recommendation may be configured to trigger a function associated with each message, a size of the AR recommendation may be varied based on the priority of the function associated with each message, and a position of the AR recommendation may be rendered based on a position of the at least one real world object in the image.

Generating at least one augmented context may include generating, by the electronic device, hot encodings for the context of the scene, the context of the user and each object class, and determining, by the electronic device, an augmented context vector that represents the at least one augmented context by determining a cross product of the hot encodings.

Filtering the second list of messages may include obtaining, by the electronic device, an augmented context vector that represents the at least one augmented context, determining, by the electronic device, a probability vector for each function of the at least one application by providing the augmented context vector and the first list of messages to the AI model, identifying, by the electronic device, the functions of the at least one application with the probability vector matches to a threshold condition, and generating, by the electronic device, the second list of messages with corresponding functions of the at least one application by sorting the identified functions of the at least one application with corresponding messages based on the probability vector.

According to an aspect of the disclosure, an electronic device for providing AR recommendations to a user may include a screen, a memory storing instructions, and a processor configured to execute the instructions to display an image on the screen, identify at least one real world object in the image, determine at least one function of at least one application installed in the electronic device based on the at least one identified real world object, and augment the at least one function of the at least one application as an AR recommendation over the image.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 11A, 11B, 11C, 11D, 11E, 11F, 11G, and 11H are diagrams of an example of providing the AR recommendations to the user using the BII, according to an embodiment;

FIGS. 13A, 13B, 13C, 13D, 13E, 13F, 13G, and 13H are diagrams of an example of providing the AR recommendations to the user based on the identifier of the real world objects, according to an embodiment.

DETAILED DESCRIPTION

Figure 1:
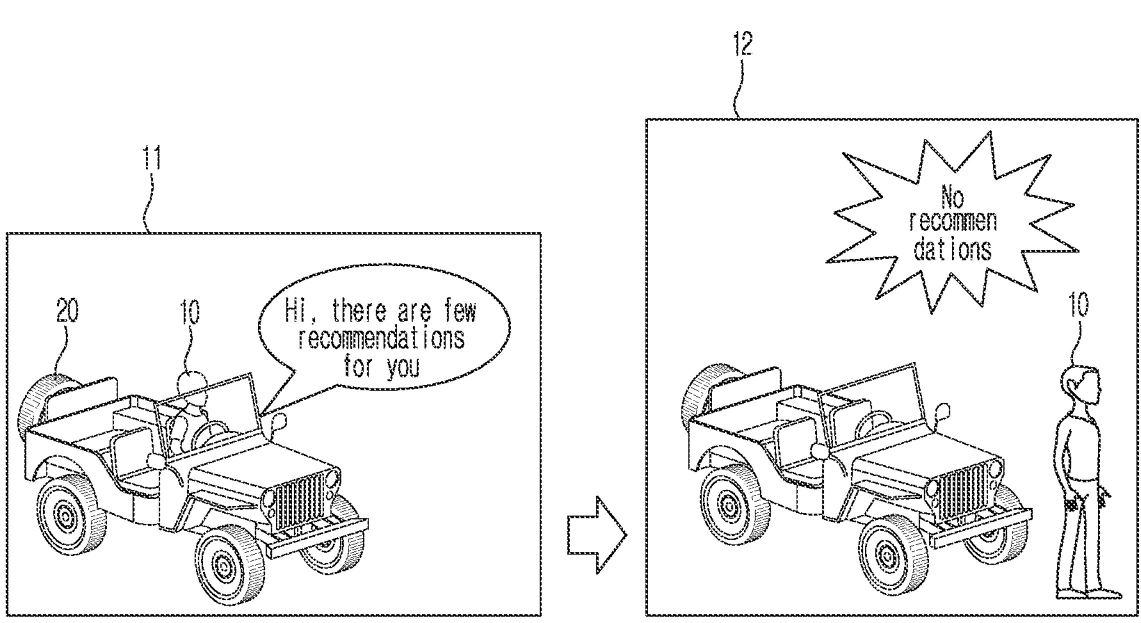
FIGS. 1-2 are diagrams of example scenarios of providing recommendations to a user by a virtual assistant device.
Figure 2:
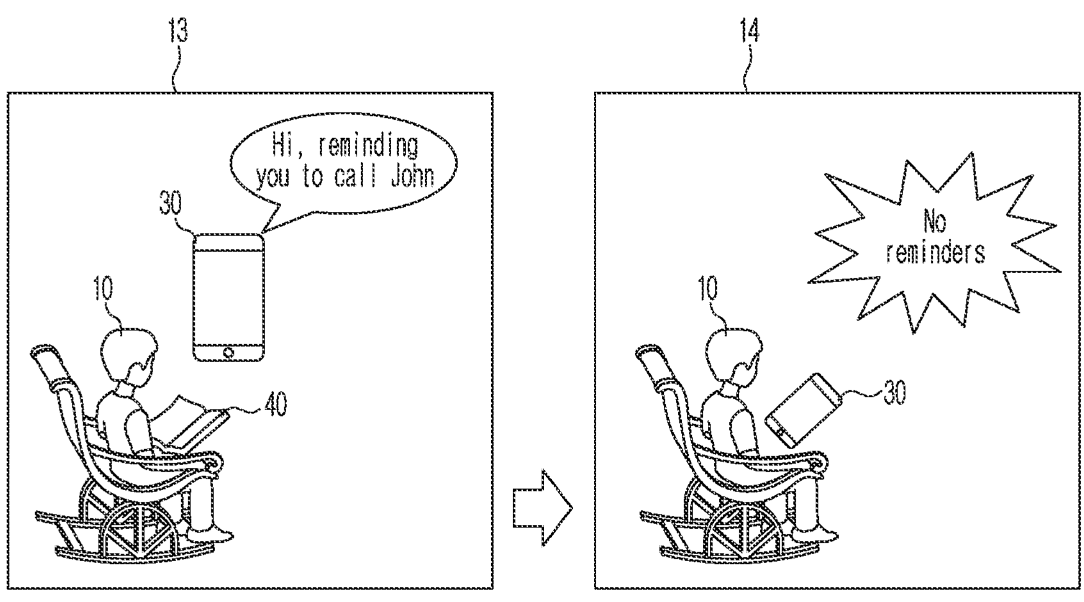

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this document, the term "object" or "real world object" are interchangeably used. Also, the term "user context" or "context of the user" or "user state" are interchangeably used. Also, the term "scene context" or "context of the scene" are interchangeably used. Also, the term "app" or "application" are interchangeably used. Also, the term "serendipity mode" or "augmented reality (AR) mode" are interchangeably used. Also, the term "application function" or "function of application" are interchangeably used.

Accordingly, the embodiments herein provide a method for providing AR recommendations to a user. The method includes displaying, by the electronic device, an image on a screen of the electronic device. The method includes identifying, by the electronic device, real world objects in the image. The method includes determining, by the electronic device, functions of applications installed in the electronic device based on the identified real world objects. The method includes augmenting, by the electronic device, the functions of the applications as the AR recommendations over the image.

Accordingly, the embodiments herein provide the electronic device for providing the AR recommendations to the user. The electronic device includes an object mapping engine, a memory, a processor, and a screen, where the object mapping engine is coupled to the memory and the processor. The object mapping engine is configured for displaying the image on the screen. The object mapping engine is configured for identifying the real world objects in the image. The object mapping engine is configured for determining the functions of the applications installed in the electronic device based on the identified real world objects. The object mapping engine is configured for augmenting the functions of the applications as the AR recommendations over the image.

The electronic device augments the functions of the application having a relationship with the real world objects in the image as the AR recommendations over the image. Examples of the functions of the application include an instant chat message to be sent to a friend, an online purchase of a laptop, a reminder set for an office call, a data object (e.g. documents, music, video, etc.) stored in the electronic device, etc. The user can quickly relate the AR recommendations with the real world objects while viewing the AR recommendations. Further, the user can take quick action by selecting the AR recommendations that are appropriate for the user, which improves a user experience in handling recommendations generated by the electronic device.

The electronic device provides a serendipity experience to the user in viewing suggestions/reminders/data-objects while watching a video/photo, and capturing/previewing an image of a scene. Since the AR recommendations are overlaying on the displayed image of the video/photo/scene, the user need not spend a dedicated amount of time for viewing the recommendations generated by the electronic device, which helps the user to save a significant amount of time.

Referring now to the drawings, and more particularly to FIGS. 3A through 14B, there are shown preferred embodiments.

Figure 3A:
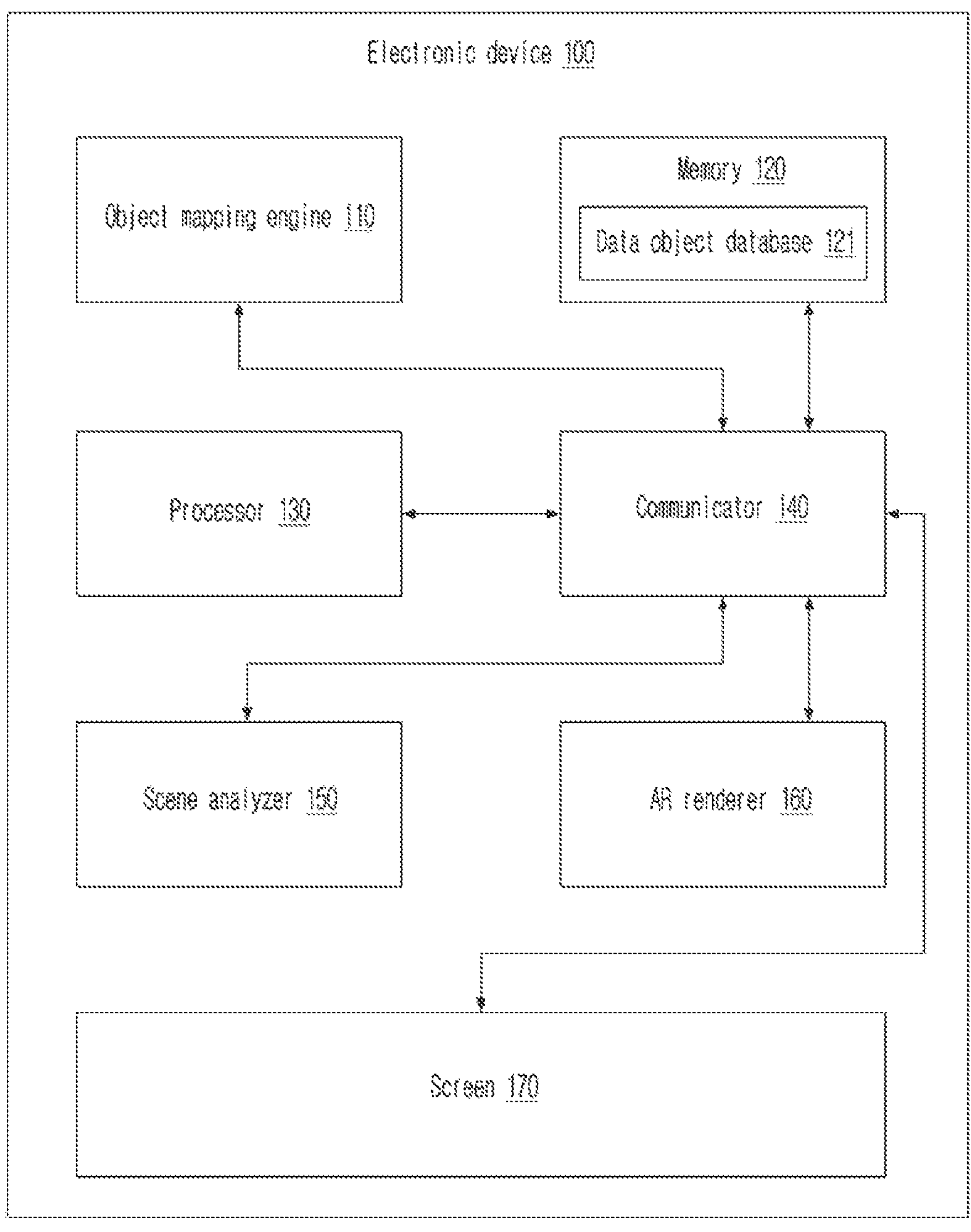
FIG. 3A is a block diagram of an electronic device for providing augmented reality (AR) recommendations to the user, according to an embodiment.

FIG. 3A is a block diagram of an electronic device 100 for providing AR recommendations to a user, according to an embodiment. Examples of the electronic device 100 include, but are not limited to a smart phone, a tablet computer, a personal digital assistance (PDA), a desktop computer, an Internet of Things (IoT), a wearable device, etc. In an embodiment, the electronic device 100 includes an object mapping engine 110, a memory 120, a processor 130, a communicator 140, a scene analyzer 150, an AR renderer 160, and a screen 170. The object mapping engine 110, the scene analyzer 150, the AR renderer 160 are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The memory 120 includes a data object database 121 that stores data objects (e.g. an icon of an application, a data file, a reminder, etc.), identifier (ID) of the data objects, mapping of real world objects to the data object. The memory 120 stores applications installed in the electronic device 100, images, videos. In an embodiment, the applications include a predefined set of identifiers of the real world objects, i.e., object ID. The memory 120 stores instructions to be executed by the processor 130. The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than its storage space. In certain examples, a non-transitory storage medium may store data that can, over time, change (e.g., in random access memory (RAM) or cache). The memory 120 can be an internal storage unit or it can be an external storage unit of the electronic device 100, a cloud storage, or any other type of external storage.

The processor 130 is configured to execute instructions stored in the memory 120. The processor 130 may be a general-purpose processor, such as a central processing unit (CPU), an application processor (AP), or the like, a graphics-only processing unit such as a graphics processing unit (GPU), a visual processing unit (VPU) and the like. The processor 130 may include multiple cores to execute the instructions. The communicator 140 is configured for communicating internally between hardware components in the electronic device 100. Further, the communicator 140 is configured to facilitate the communication between the electronic device 100 and other devices via one or more networks (e.g. Radio technology). The communicator 140 includes an electronic circuit specific to a standard that enables wired or wireless communication.

The object mapping engine 110 displays an image on the screen 170 such as a light emitting diode (LED) screen, a liquid-crystal display (LCD) screen, etc. In an embodiment, the object mapping engine 110 obtains the image from a camera of the electronic device 100 for displaying on the screen 170 while the camera captures a preview/video/photo of a scene. In another embodiment, the object mapping engine 110 obtains the image for displaying on the screen 170 from the images and videos stored in the memory 120. In another embodiment, the object mapping engine 110 obtains the image for displaying on the screen 170 from an external source such as a server of online video/photo/social-media applications.

The object mapping engine 110 checks an interest of the user to see the AR recommendations while displaying the image. In an example, the object mapping engine 110 overlays a notification window over the image, indicates the user whether the user wants to see the AR recommendations. Further, the object mapping engine 110 displays an option such as "AR mode" or "Serendipity mode". The user can provide an input (e.g. tap) on the option if the user is interested to see the AR recommendations. In response to receiving the input on the option, the object mapping engine 110 detects that the user is interested to see the AR recommendations.

The object mapping engine 110 identifies the real world objects (e.g. human, dog, football, sofa, etc.) in the image using the scene analyzer 150. In an embodiment, the object mapping engine 110 identifies the real world objects upon detecting that the user is interested to see the AR recommendations. The object mapping engine 110 determines functions (e.g. send an instant message, pay an electricity bill, schedule a meeting, etc.) of the applications installed in the electronic device 100 based on the identified real world objects. In an embodiment, a function of the application can be the data object such as a data file readable using the application, a reminder set on the application. In an embodiment, the object mapping engine 110 determines the identifier of the identified real world objects. Further, the object mapping engine 110 matches the identifier of the identified real world objects with the predefined set of identifiers embedded with the applications. Further, the object mapping engine 110 fetches the functions of the applications based on the match between the identifier of the identified real world objects and the predefined set of identifiers. In another embodiment, the object mapping engine 110 can use existing systems such as a built-in intent (BII) for fetching the functions of the applications installed in the electronic device 100. The object mapping engine 110 augments the functions of the applications as the AR recommendations over the image using the AR renderer 160.

In an embodiment, the object mapping engine 110 is configured to classify the identified real world objects to one or more object classes based on an attribute of the identified real world objects using the scene analyzer 150 (refer FIG.

3B). An object class includes one or more real world objects with certain common attributes. Example of the object class includes, but not limited to family & kids, cutlery, furniture sports equipment, etc. Example of the attribute includes, but not limited to a tag given by the user, a relationship with the user, a category of the real world object, etc. The object mapping engine 110 determines an intention of each function of the applications for each object class. The intention of one function of an application is a purpose for which that function is created in the application. For example, the function may be created for communication, shopping, travel, food, etc.

Further, the object mapping engine 110 identifies a preferred data type linked to the intention of each function of the applications for each object class. In an embodiment, the preferred data type indicates a favorite item the user mostly wishes. For example, the preferred data type can be a favorite contact, a favorite food/cuisine, a favorite game, a favorite time slot, etc. In another embodiment, the preferred data type is the identified object. Further, the object mapping engine 110 fetches the data objects linked to the preferred data type from the data object database 121. Further, the object mapping engine 110 fetches a message content mapped to each function of the applications. The message content is already available at the application, which is embedded with the application while creating the application. In case of BII, the message content is maintained in an internal mapping table, wherein the message content is mapped to the BII. An example of the message content is "Share the moment". Further, the object mapping engine 110 generates a first list of messages with corresponding functions of the application using the mapped message content and the data objects for each object class. The first list includes a list of application functions.

Further, the object mapping engine 110 is configured to determine a context of the scene in the image using the scene analyzer 150. The context of the scene includes an activity doing/done on each object class and an activity doing/done by each object class. An example of the activity doing/done on the object class is the sports equipment is used for playing. An example of the activity doing/done by the object class is the family & kids playing on a lawn.

Further, the object mapping engine 110 determines a context of the user of the electronic device 100 in real time. The context of the user includes a temporal context (e.g. current time, morning, Saturday, etc.), a spatial context (e.g. home, office, airport, etc.), a network context (e.g. cellular connection, Wi-Fi connection, etc.), and a physiological context (e.g. posture, heartbeat, etc.) of the user. Further, the object mapping engine 110 generates an augmented context using the context of the scene, and the context of the user for each object class. The augmented context indicates an overall digital representation of the scene with respect to the real world objects in the scene and a user's mental/physical state (i.e. condition) while viewing the scene.

Figure 3B:
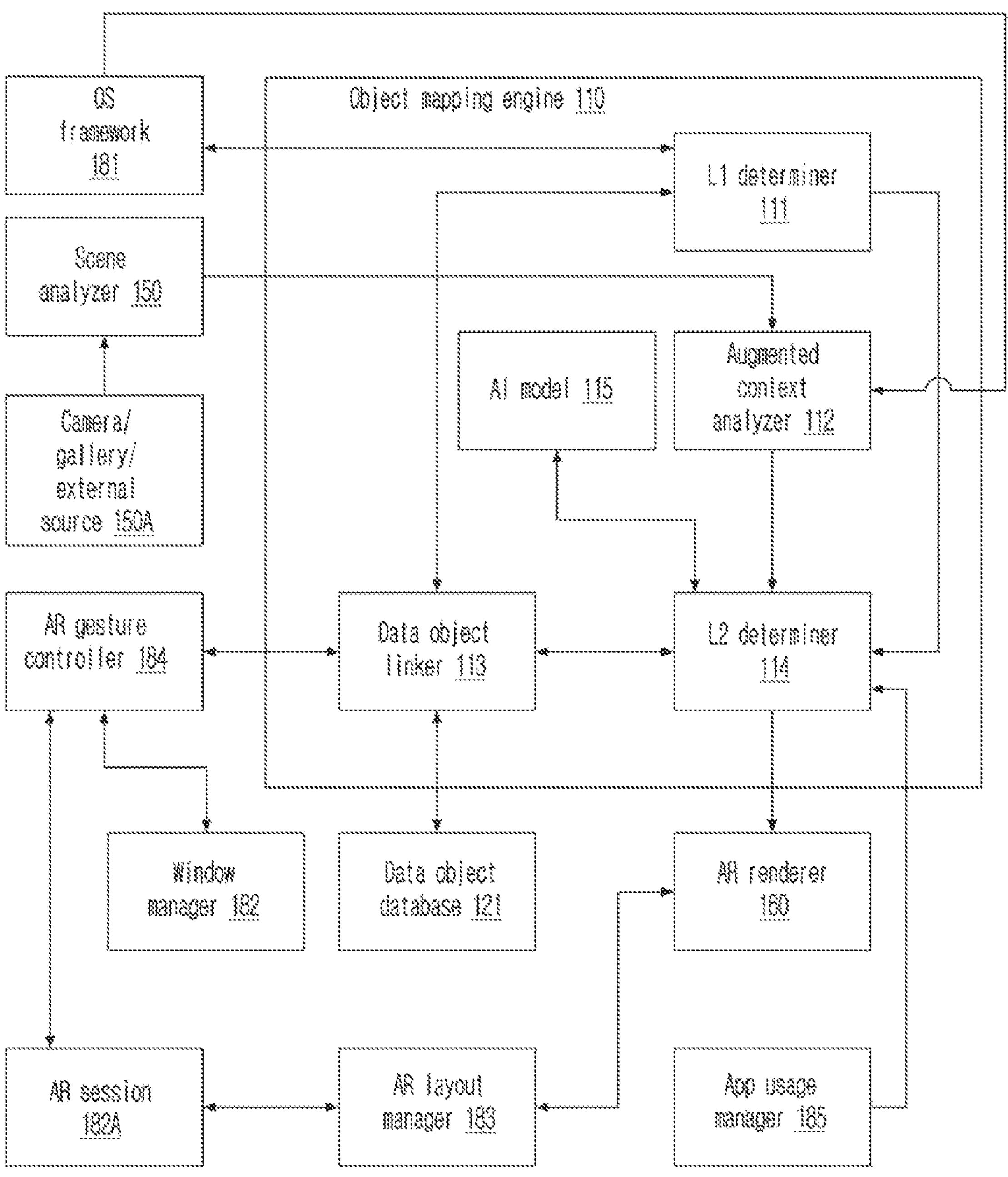
FIG. 3B is a block diagram of an object mapping engine for augmenting functions of applications as the AR recommendations over a displayed image, according to an embodiment.

Further, the object mapping engine 110 filters a second list of messages with corresponding functions of the applications from the first list for each object class by applying the augmented context to an artificial intelligence (AI) model 115 (refer FIG. 3B). In an embodiment, the object mapping engine 110 generates hot encodings for the context of the scene, the context of the user, and the object class. Further, the object mapping engine 110 determines an augmented context vector that represents the augmented context by determining a cross product of the hot encodings. Further, the object mapping engine 110 determines a probability vector for each function of the applications by providing the augmented context vector and the first list to the AI model 115. Further, the object mapping engine 110 identifies the functions of the applications with the probability vector matches to a threshold condition. Further, the object mapping engine 110 generates the second list of messages with corresponding functions of the applications by sorting the identified functions of the applications with corresponding messages based on the probability vector.

The object mapping engine 110 determines a priority of the functions of the applications corresponding to the second list of messages based on a usage history or a historical usage frequency of the functions of the applications. Further, the object mapping engine 110 filters a third list of messages with corresponding functions of the applications from the second list for each object class based on the priority of the functions of the applications corresponding to the second list of messages. Further, the object mapping engine 110 augments each message in the third list as the AR recommendations over the image using the AR renderer 160. The object mapping engine 110 configures the AR recommendations to trigger the function associated with each message upon receiving a user input on the AR recommendations. In an embodiment, the object mapping engine 110 adjusts a size of the AR recommendations based on the priority of the function associated with the message. In an embodiment, the object mapping engine 110 renders the AR recommendations to a specific position on the image based on a position of the real world objects in the image. The object mapping engine 110 launches the application function based on a user's selection of the displayed application function for the object.

Although the FIG. 3A shows the hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the invention. One or more components can be combined together to perform the same or substantially similar function for providing the AR recommendations to the user.

FIG. 3B is a block diagram of the object mapping engine 110 for augmenting the functions of the applications as the AR recommendations over the displayed image, according to an embodiment. In an embodiment, the object mapping engine 110 includes a Level-1 (L1) determiner 111, an augmented context analyzer 112, a data object linker 113, a Level-2 (L2) determiner 114, and the AI model 115 made of artificial neural networks. The L1 determiner 111, the augmented context analyzer 112, the data object linker 113, the L2 determiner 114, and the AI model 115 are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In another embodiment, the electronic device 100 additionally includes a framework 181 of an operating system (OS) running on the electronic device 100, a window manager 182, an AR layout manager 183, an AR gesture controller 184, and an app usage manager 185. The OS framework 181 determines the context of the user of the electronic device 100 in real time and provides the user context to the augmented context analyzer 112. The AR layout manager 183 starts and maintains session 182A in an AR view of the recommendations and implements callback for any AR state change. The AR layout manager 183 determines the placement of rendered control in the AR view of the recommendations. The AR gesture controller 184 provides bidirectional real time control for user gestures over rendered AR view of the recommendations. The app usage manager 185 monitors a consumption of each function of the application by the user and provides this application consumption information to the L2 determiner 114.

The scene analyzer 150 receives the image from the camera/gallery/external source 150A. The scene analyzer 150 identifies the real world objects in the image and determines the context of the scene from the image, and provides the scene context and information on the identified real world objects to the augmented context analyzer 112. In an embodiment, the scene analyzer 150 analyzes the scene from the received image, and extracts scene information. Further, the scene analyzer 150 identifies the object from the scene information. The scene analyzer 150 determines the identifier of the identified real world objects. The scene analyzer 150 classifies the identified real world objects into one or more object classes based on the attribute of the identified real world objects.

The L1 determiner 111 determines the functions of the applications installed in the electronic device 100 based on the identified real world objects. The L1 determiner 111 matches the identifier of the identified real world objects with the predefined set of identifiers embedded with the applications. The L1 determiner 111 fetches the functions of the applications based on the match between the identifier of the identified real world objects and the predefined set of identifiers. In another embodiment, the L1 determiner 111 uses the existing systems such as the BII for fetching the functions of the applications installed in the electronic device 100. The L1 determiner 111 determines the intention of each function of the applications for each object class. The L1 determiner 111 identifies the preferred data type linked to the intention of each function of the applications for each object class. The L1 determiner 111 fetches the data objects linked to the preferred data type from the data object database 121. The L1 determiner 111 fetches the message content mapped to each function of the applications.

The L1 determiner 111 generates the first list of messages with corresponding functions of the application using the mapped message content and the data objects for each object class. Further, the L1 determiner 111 provides the first list of messages with corresponding functions of the application to the L2 determiner 114. The L1 determiner 111 aggregates the data objects saved by the user with referent to the real world objects. In another embodiment, the L1 determiner 111 collects app activities/functions associated with the real world object. The applications installed in the electronic device 100 are assumed to be able to tag activities/functions with the real world objects using the proposed method. An app developer can also mark/tag an intention of the activities/functions of the application in the application manifest or metadata with the object tags of their interest.

The augmented context analyzer 112 generates the augmented context using the scene context, and the user context for each object class, and provides the augmented context to the L2 determiner 114. In an embodiment, the augmented context analyzer 112 generates the hot encodings for the context of the scene, the context of the user, and the object class. The augmented context analyzer 112 determines the augmented context vector that represents the augmented context by determining the cross product (i.e. vector multiplication) of the hot encodings.

The L2 determiner 114 filters the second list of messages with corresponding functions of the applications from the first list for each object class by applying the augmented context to the AI model 115. The L2 determiner 114 determines the probability vector for each function of the applications by applying the augmented context vector and the first list on the AI model 115. The L2 determiner 114 identifies the functions of the applications with the probability vector matches to the threshold condition. The L2 determiner 114 generates the second list of messages with corresponding functions of the applications by sorting the identified functions of the applications with corresponding messages based on the probability vector. The L2 determiner 114 determines the historical usage frequency of the functions of the applications based on the application consumption information received from the app usage manager 185.

The L2 determiner 114 determines the priority of the functions of the applications corresponding to the second list of messages based on the historical usage frequency of the functions of the applications. The L2 determiner 114 filters the third list of messages with corresponding functions of the applications from the second list for each object class based on the priority of the functions of the applications corresponding to the second list of messages. In an embodiment, the filtered list of messages with application functions are arranged in a descending order of priority. The L2 determiner 114 configures the AR recommendations to trigger the function associated with each message upon receiving a user input on the AR recommendations. The L2 determiner 114 implements the AI model 115 for learning activities and the data objects related to the augmented context.

The AR renderer 160 augments the functions of the applications as the AR recommendations over the image. The AR renderer 160 augments each message in the third list as the AR recommendations over the image close to the real world object in the AR view. The AR renderer 160 renders deep-level settings/sub-function of the application in the AR view. In an embodiment, the AR renderer 160 displays the filtered application functions for the object based on the priority, by augmenting the filtered application functions as the AR recommendation over the image, where the AR recommendation is configured to trigger the filtered application functions, wherein the size of the AR recommendation is varied based on the priority of the application function, and the position of the AR recommendation is rendered based on a position of the object in the image.

The data object linker 113 creates/updates the mapping of real world objects to the data object into the data object database 121. The data object linker 113 retrieves the mapping of real world objects to the data object from the data object database 121 to assist the L1 determiner 111 to fetches the data objects. The data object linker 113 links the real world objects with the data objects like files and reminders or notes.

Although the FIG. 3B shows the hardware components of the object mapping engine 110 but it is to be understood that other embodiments are not limited thereon. In other embodiments, the object mapping engine 110 may include less or more number of components. Further, the labels or names of the components are used only for illustrative purpose and does not limit the scope of the invention. One or more components can be combined together to perform the same or substantially similar function for augmenting the functions of the applications as the AR recommendations over the displayed image.

Figure 4:
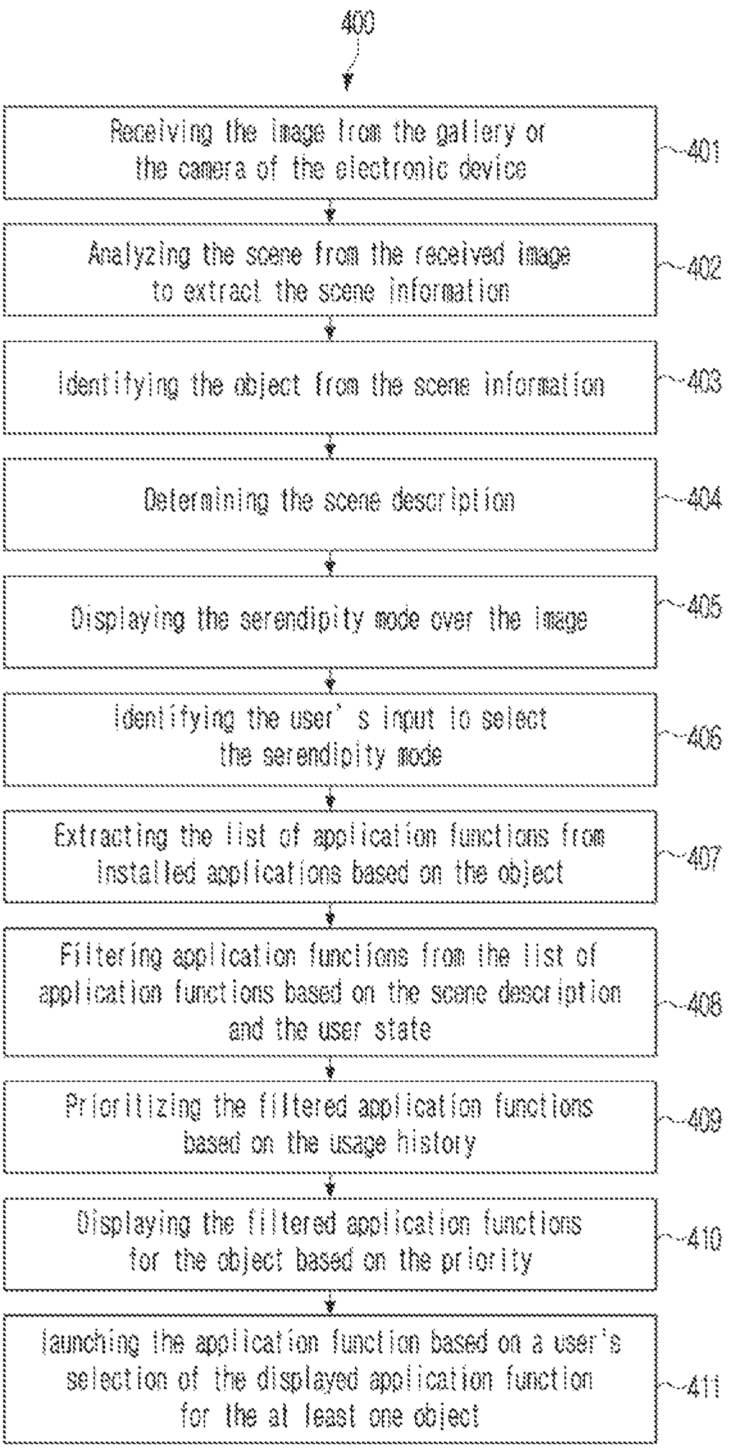
FIG. 4 is a flow diagram illustrating a method for providing an actionable content in the electronic device, according to an embodiment.

FIG. 4 is a flow diagram 400 illustrating a method for providing the actionable content in the electronic device 100, according to an embodiment. In an embodiment, the method allows the object mapping engine 110 to perform operations 401-411. In operation 401, the method includes receiving the image from the gallery or the camera of the electronic device 100. In operation 402, the method includes analyzing the scene from the received image to extract the scene information. In operation 403, the method includes identifying the object from the scene information. In operation 404, the method includes determining the scene description. In operation 405, the method includes displaying the serendipity mode over the image. In operation 406, the method includes identifying the user's input to select the serendipity mode. In operation 407, the method includes extracting the list of application functions from the installed applications based on the object. In operation 408, the method includes filtering the application functions from the list of application functions based on the scene description and the user state. In operation 409, the method includes prioritizing the filtered application functions based on the usage history. In operation 410, the method includes displaying the filtered application functions for the object based on the priority. In operation 411, the method includes launching the application function based on the user's selection of the displayed application function for the object.

Figure 5:
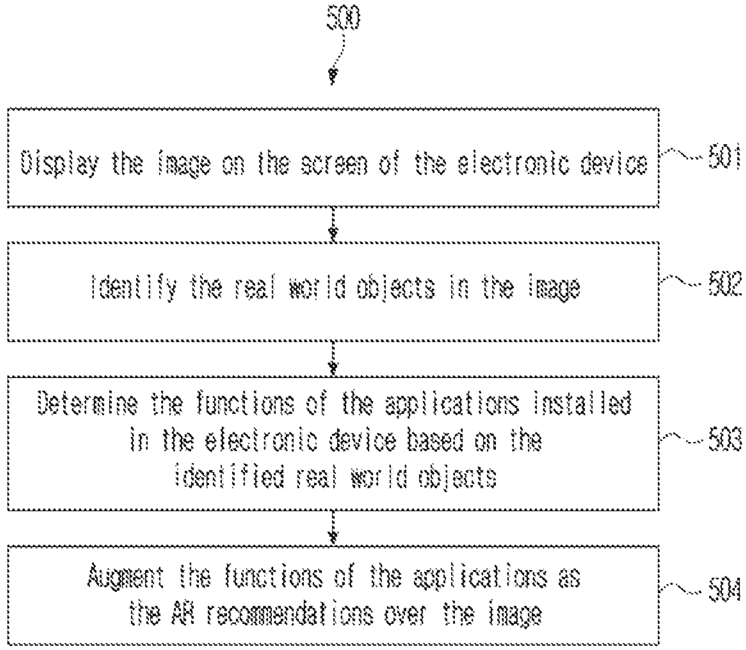
FIG. 5 is a flow diagram illustrating a method for providing the AR recommendations to the user, according to an embodiment.

FIG. 5 is a flow diagram 500 illustrating a method for providing the AR recommendations to the user, according to an embodiment. In an embodiment, the method allows the object mapping engine 110 to perform operations 501-504. In operation 501, the method includes displaying the image on the screen 170 of the electronic device 100. In operation 502, the method includes identifying the real world objects in the image. In operation 503, the method includes determining the functions of the applications installed in the electronic device 100 based on the identified real world objects. In operation 504, the method includes augmenting the functions of the application as the AR recommendations over the image.

Figure 6:
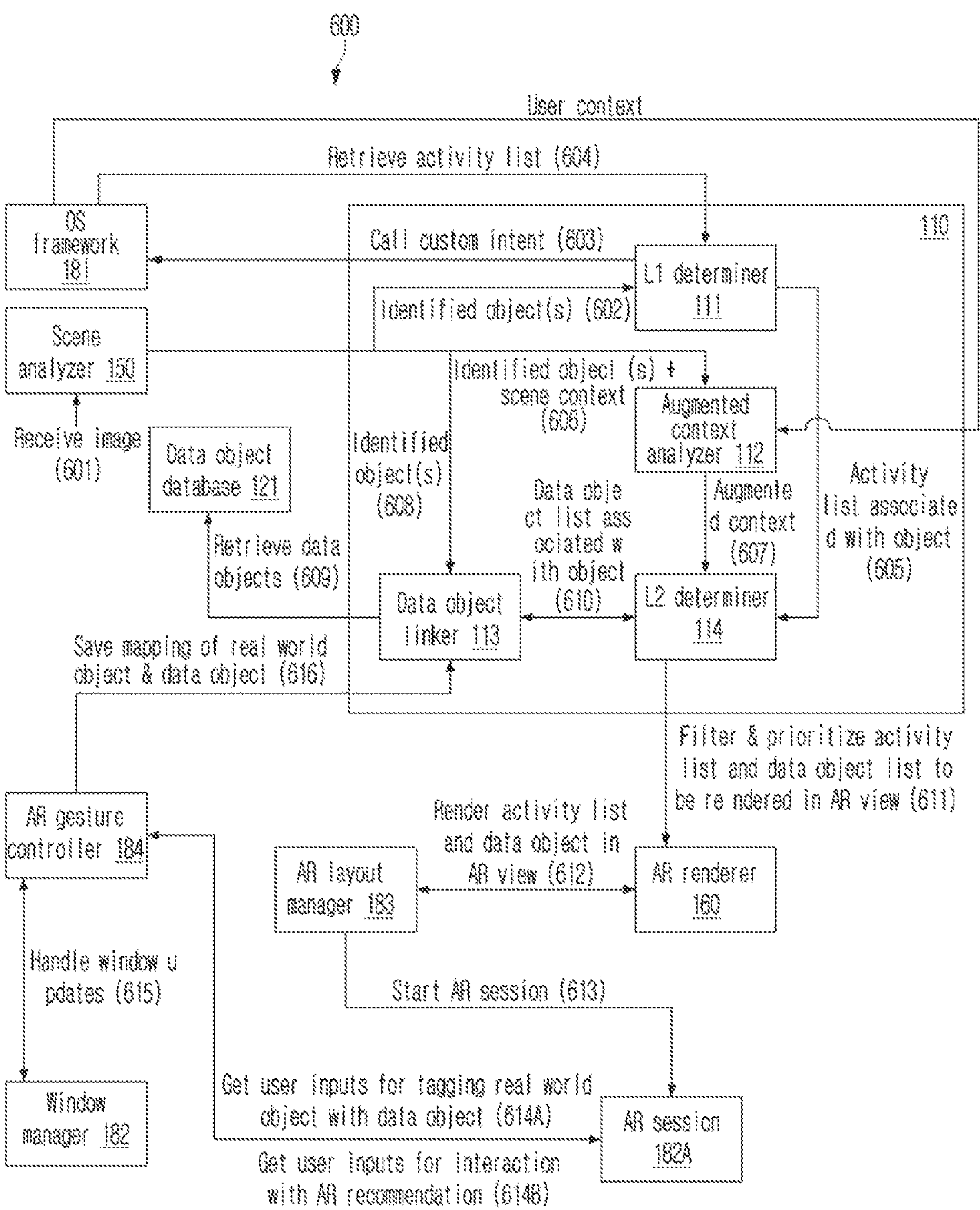
FIG. 6 is a flow diagram illustrating a method for augmenting the functions of the applications as the AR recommendations over the displayed image, according to an embodiment.

FIG. 6 is a flow diagram 600 illustrating a method for augmenting the functions of the applications as the AR recommendations over the displayed image, according to an embodiment. The flow diagram 600 comprises operations 601-616. In operation 601, the scene analyzer 150 receives the image. In operation 602, the scene analyzer 150 identifies the real world objects in the image and provides the information of the identified real world objects to the L1 determiner 111. In operation 603, the L1 determiner 111 sends a call to the OS framework 181 for custom intents. In operation 604, the OS framework 181 retrieves a list of activities performed by the applications and provides the retrieved activity list to the L1 determiner 111. In operation 605, the L1 determiner 111 associates each activity in the list relevant for each identified real world object and provides the activity list associated with the real world objects to the L2 determiner 114. In operation 606, the scene analyzer 150 determines the scene context from the image and provides the scene context and the information of the identified real world objects to the augmented context analyzer 112. The OS framework 181 provides the user context to the augmented context analyzer 112.

In operation 607, the augmented context analyzer 112 generates the augmented context based on the scene context, the user context and the information of the identified real world objects, and provides the augmented context to the L2 determiner 114. In operation 608, the scene analyzer 150 provides the information of the identified real world objects to the data object linker 113. In operation 609, the data object linker 113 retrieves the data objects associated with the real world objects from the mapping in the data object database 121. In operation 610, the data object linker 113 provides a list of the data objects associated with the real world objects to the L2 determiner 114. In operation 611, the L2 determiner 114 filters and prioritizes activity list and the data object to be rendered in the AR view. In operation 612, the AR renderer 160 renders the activity list and the list of data object in the AR view. In operation 613, the AR layout manager 183 starts the AR session 182A. In operation 614A, the AR gesture controller 184 gets the user inputs for tagging the real world object with the data object after starting the AR session 182A. In operation 614B, the AR gesture controller 184 may also receive the user inputs for interaction with the AR recommendation after starting the AR session 182A. In operation 615, the AR gesture controller 184 handles the window updates with an assistance of the window manager. In operation 616, the AR gesture controller 184 provides the mapping of the real world object and the data object to the data object linker 113 for saving the mapping to the data object database 121.

Figure 7:
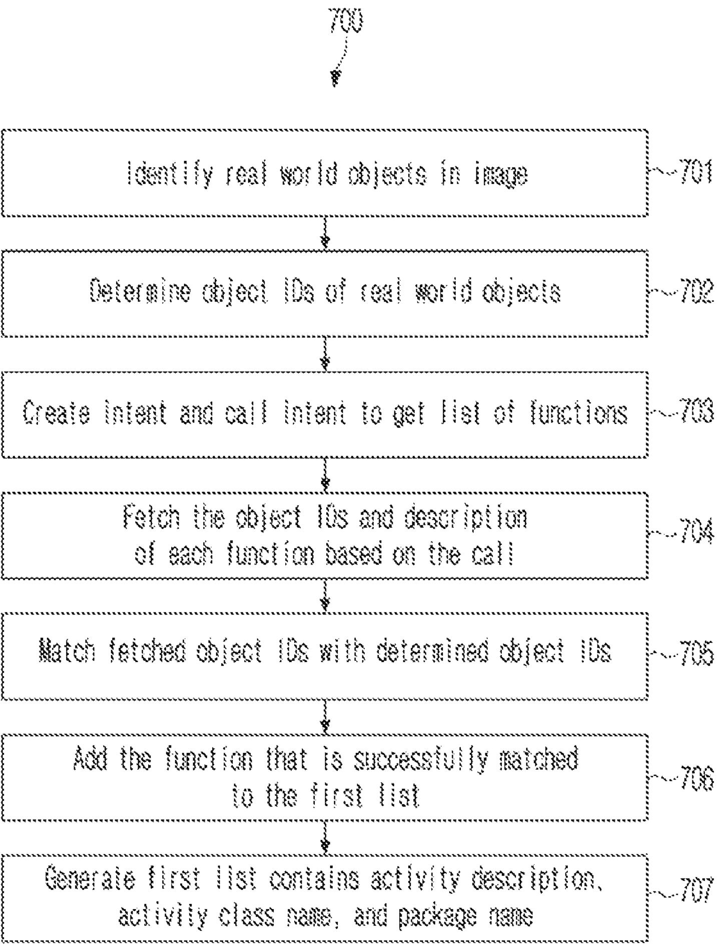
FIG. 7 is a flow diagram illustrating a method for generating a first list containing activity description, activity class name, and package name by a Level-1 determiner, according to an embodiment.

FIG. 7 is a flow diagram 700 illustrating a method for generating the first list containing activity description, activity class name, and package name by the L1 determiner 111, according to an embodiment as. In an embodiment, the method allows the L1 determiner 111 to perform operations 701-707. In operation 701, the method includes identifying the real world objects in the image. In operation 702, the method includes determining the object IDs of objects. In operation 703, the method includes creating an intent and calling the intent to get a list of functions of the applications. In operation 704, the method includes fetching the object IDs and a description of each function based on the call. In operation 705, the method includes matching the fetched object IDs with the determined object IDs. In operation 706, the method includes adding the function that is successfully matched to the first list. In operation 707, the method includes generating the first list containing an activity description, an activity class name, and a package name.

Figure 8:
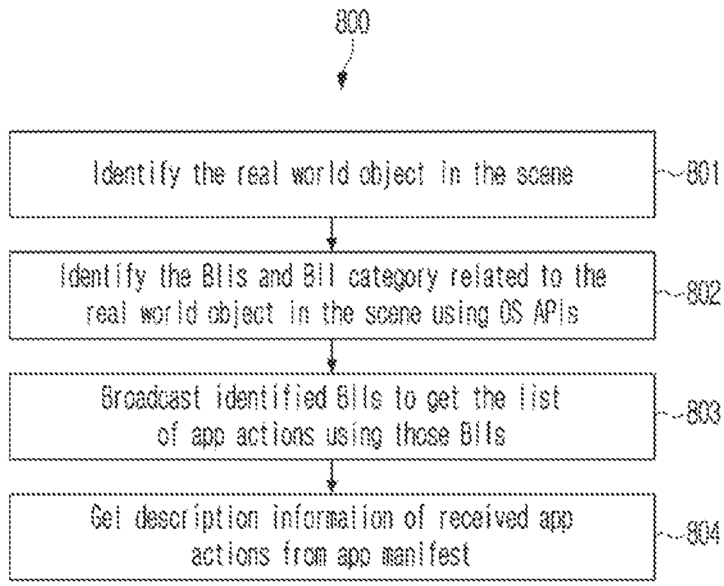
FIG. 8 is a flow diagram illustrating a method of generating the first list of application function using a built-in intent (BII), according to an embodiment.

FIG. 8 is a flow diagram 800 illustrating a method of generating the first list of application function using the BII, according to an embodiment. In an embodiment, the method allows the L1 determiner 111 to perform operations 801-804. In operation 801, the method includes identifying the real world object in the scene. In operation 802, the method includes identifying the BIIs and BII category related to the real world object in the scene using OS Application Programming Interfaces (APIs). In operation 803, the method includes broadcasting the identified BIIs to get a list of app actions using those BIIs. In operation 804, the method includes getting a description information of the received app actions from the app manifest.

Figure 9:
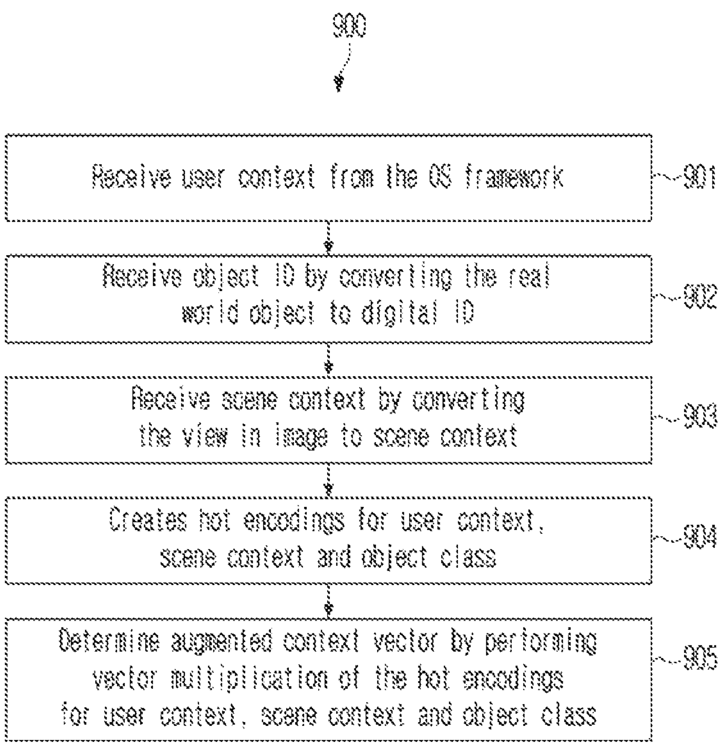
FIG. 9 is a flow diagram illustrating a method for determining an augmented context by an augmented context analyzer, according to an embodiment.

FIG. 9 is a flow diagram 900 illustrating a method for determining the augmented context by the augmented context analyzer 112, according to an embodiment. In an embodiment, the method allows the augmented context analyzer 112 to perform operations 901-905. In operation 901, the method includes receiving the user context from the OS framework 181. In operation 902, the method includes receiving the object ID by converting the real world object to a digital ID using the proposed method. In operation 903, the method includes receiving the scene context by converting the view in the image to scene context. In operation 904, the method includes creating the hot encodings for the user context, the scene context, and the object class. In operation 905, the method includes determining the augmented context vector by performing vector multiplication of the hot encodings for the user context, the scene context, and the object class.

Figure 10A:
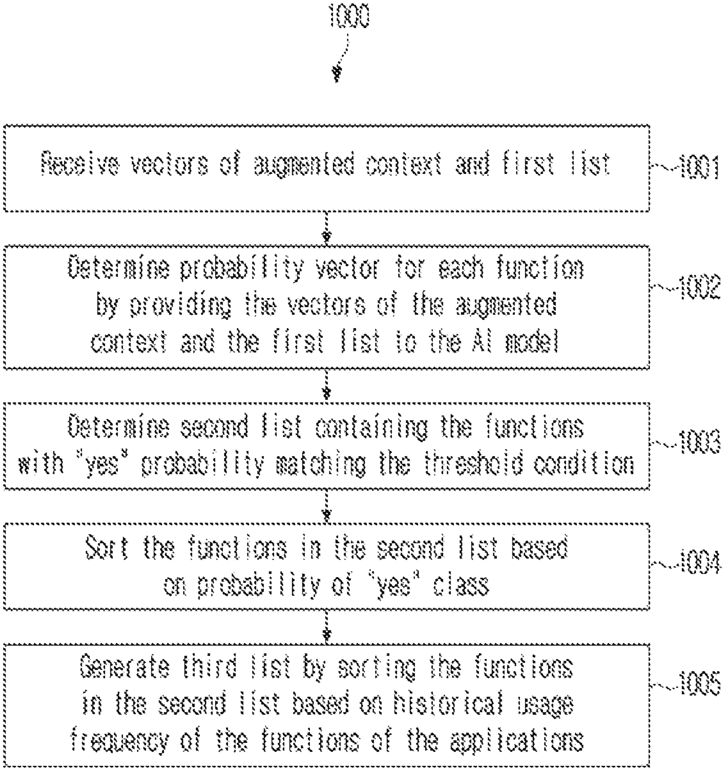
FIG. 10A is a flow diagram illustrating a method for generating a third list by a L2 determiner, according to an embodiment.

FIG. 10A is a flow diagram 1000 illustrating a method for generating the third list by the L2 determiner 114, according to an embodiment as disclosed herein. In an embodiment, the method allows the L2 determiner 114 to perform operations 1001-1005. In operation 1001, the method includes receiving the vectors of the augmented context and the first list. In operation 1002, the method includes determining the probability vector for each function by providing the vectors of the augmented context and the first list to the AI model 115. In operation 1003, the method includes determining the second list containing the functions with "yes" probability matching the threshold condition. In operation 1004, the method includes sorting the functions in the second list based on the probability of "yes" class. In operation 1005, the method includes generating the third list by sorting the functions in the second list based on the historical usage frequency of the functions of the applications.

The various actions, acts, blocks, steps, or the like in the flow diagrams 400, 500, 600, 700, 800, 900, and 1000 may be performed in the order presented, in a different order, or simultaneously. Further, in some embodiments, some of the actions, acts, blocks, steps, or the like may be omitted, added, modified, skipped, or the like without departing from the scope of the invention.

Figure 10B:
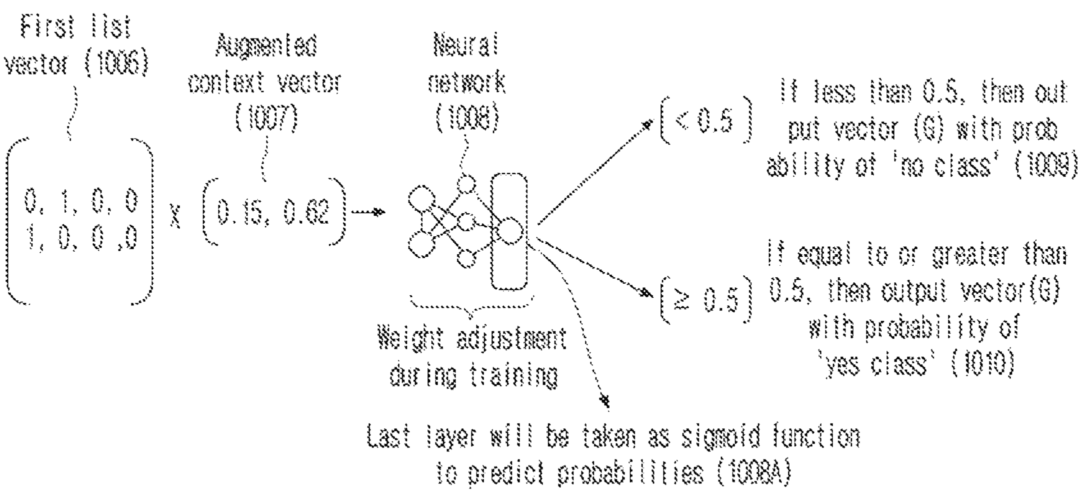
FIG. 10B is a diagram of an example of determining a probability vector for each function for determining a second list, according to an embodiment.

FIG. 10B is a diagram of an example of determining a probability vector for each function for determining the second list, according to an embodiment. In the example, the augmented context analyzer 112 determines the augmented context vector 1007 that represents the augmented context. The L2 determiner 114 determines a vector representation of the first list, named as a first list vector 1006. Further, the L2 determiner 114 determines the second list of messages with corresponding functions of the applications by performing vector multiplication of the first list vector 1006 with augmented context vector 1007. Further, the L2 determiner 114 provides an output of the vector multiplication of the first list vector 1006 with augmented context vector 1007 to the AI model 115 comprising neural networks 1008, where a last layer of the neural networks 1008 uses a sigmoid function to predict probabilities.

The weights of the neural networks 1008 will change during a training phase. An output of the AI model 115 is the probability vector for each function of the applications with a value between 0 to 1. Further, the L2 determiner 114 checks whether the probability vector of each function of the applications matches to the threshold condition (e.g. probability vector≥0.5, probability vector≥50%). If probability vector matches to the threshold condition, then the L2 determiner 114 classifies the probability vector with that function of the applications to a 'yes class' 1010. If the probability vector does not match to the threshold condition (e.g. probability vector<0.5, probability vector<50%), then the L2 determiner 114 classifies the probability vector with that function of the applications to a 'no class' 1019.

FIGS. 11A, 11B, 11C, 11D, 11E, 11F, 11G, and 11H are diagrams of an example of providing the AR recommendations to the user using the BII, according to an embodiment. In this exemplary embodiment, the applications installed in the electronic device 100 contains the BII. In an example scenario, the user may be watching the preview of a scene that includes playing frisbee disc sport by user's family members and a pet dog 1101E on a lawn outside a house, using the camera of the electronic device 100 by operating the electronic device 100 in a photo mode. The electronic device 100 displays the image of the scene while previewing the scene as shown in 1101 of the FIG. 11A. The family members include mother 1101A, sister 1101B, father 1101C, and brother 1101D. A frisbee disc 1101F, a chair 1101H, and a tea jug 1101G is also present in the scene, where the chair 1101H, and the tea jug 1101G are located at a patio of the house. The object mapping engine 110 overlays the notification window 1102 over the image to indicate the user whether the user want to see the AR recommendations.

Further, the object mapping engine 110 displays the option "Serendipity mode". In operation 1103, the user wishes to view the AR recommendations, and hence the user taps on the option "Serendipity mode". In response to receiving the tap input on the option "Serendipity mode", the electronic device 100 detects that the user is interested to view the AR recommendations. In operation 1104, upon detecting that the user is interested to view the AR recommendations, the scene analyzer 150 identifies the objects includes 4 persons 1101A-1101D, the chair 1101H, the tea jug 1101G, frisbee disc 1101F, and the dog 1101E in the scene. Further, the scene analyzer 150 searches for photos of the user with other persons stored in the electronic device 100 using a gallery app. In operation 1105, the gallery app provides the attributes such as a name and a relationship tagged by the user on the photos of each person to the scene analyzer 150. Further, the scene analyzer 150 determines the relationship between the user and the 4 persons and identifies that the 4 persons are family members of the user based on the received attributes.

In operation 1106, the scene analyzer 150 groups object with similar attributes to a single class. for example, the 4 persons i.e. person1=father 1101C, person2=mother 1101A, person3=sister 1101B, person4=brother 1101D are grouped into a class named family & kids, the dog 1101E is categorized to a class named pet, the chair 1101H is categorized to a class furniture, the tea jug 1101G is categorized to a class named cutlery, the frisbee disc 1101F is categorized to a class named sports equipment. In operation 1107, the L1 determiner 111 gets a list of BII 1107A associated with identified object class from the internal mapping, where the list of BII 1107A is given in Table 1.

TABLE 1

| Object class | BII | Intention/BII category |
|---|---|---|
| Family & Kids | Create call | Communication |
| | Get Offer | Shopping |
| | Get Product | Shopping |
| Cutlery | Order menu item | Food and drink |
| | Get reservation | Travel |
| Furniture | Get Product | Shopping |
| Sports equipment | Get News article | Common |
| Pet | Get Product | Shopping |
| | Get Thing | Common |

In operation 1108, the L1 determiner 111 fetches all applications and their functions that implemented the identified BII's in their actions.xml and shortcut.xml. Further, the L1 determiner 111 obtains the preferred data type using mapping table as shown in 1108A of the FIG. 11B, which is given in Table 2.

TABLE 2

| Object class | BII | Intention/ BII category | Apps | App Function | Preferred data type |
|---|---|---|---|---|---|
| Family & Kids | Create call | Communication | Phone app | Make a video call | Favorite Contact |
| | | Communication | Instant chat app | Make a video call | Favorite Contact |
| | Get Offer | Shopping | Shopping app | Find offers | Identified Object |
| | Get Product | Shopping | Shopping app | Order an item | Identified Object |
| Cutlery | Order menu item | Food and drink | Food booking app | Order an item | Favorite Cuisine |
| | Get reservation | Travel | Restaurant booking app | Check my reservation | Booking Time |
| Furniture | Get Product | Shopping | Shopping app | Order an item | Identified Object |
| Sports equipment | Get News article | Common | News app | Search news | Identified Object |
| Pet | Get Product | Shopping | Shopping app | Order and item | Identified Object |
| | Get Thing | Common | Event booking app | Look for events | Identified Object |

In operation 1109, the L1 determiner 111 fetches the data objects linked to the preferred data type for each app function and adds to the mapping table as shown in 1109A of the FIG. 11C, which is given in Table 3.

TABLE 3

| Object class | BII | Intention/BII category | Apps | App Function | Preferred data type | Data object |
|---|---|---|---|---|---|---|
| Family & Kids | Create call | Communication | Phone app | Make a video call | Favorite Contact | Mike, Grandma |
| | | Communication | Instant chat app | Make a video call | Favorite Contact | Mike, Grandma |
| | Get Offer | Shopping | Shopping app | Find offers | Identified Object | Family & Kids |
| | Get Product | Shopping | Shopping app | Order an item | Identified Object, | Family & Kids |
| Cutlery | Order menu item | Food and drink | Food booking app | Order an item | Favorite Cuisine | Indian, Korean |
| | Get reservation | Travel | Restaurant booking app | Check my reservations | Booking Time | Night |
| Furniture | Get Product | Shopping | Shopping app | Order an item | Identified Object | Furniture |
| Sports equipment | Get News article | Common | News app | Search news | Identified Object | Sports equipment |
| Pet | Get Product | Shopping | Shopping app | Order and item | Identified Object | Dog |
| | Get Thing | Common | Event booking app | Look for events | Identified Object | Dog |

In an example 124, the L1 determiner 111 communicates with the gallery app to obtain the data objects linked to the favorite cuisine (i.e. preferred data type) of the user. The gallery contains pictures of dishes the user had at different places with the name of the dishes tagged in the gallery app, which allows the L1 determiner 111 in determining the favorite cuisines with the most tags. In the example, the L1 determiner 111 identifies that Indian and Korean cuisines (i.e. data objects) are the favorite cuisines of the user based on the number of tags. In another example 122, the L1 determiner 111 communicates with a contact app installed in the electronic device 100 to obtain the data objects linked to the favorite contact (i.e. preferred data type) of the user. The user may mention that Grandma and a friend "Mike" are in as the favorite contacts. Therefore, the contact app shares the contacts of Grandma and Mike (i.e. data objects) as the favorite contacts of the user to the L1 determiner 111. In another example 123, the L1 determiner 111 communicates with a clock app installed in the electronic device 100 to obtain the data objects linked to the current time (i.e. preferred data type) of the user. The current time may be 1 PM. Therefore, the clock app shares 1 PM (i.e. data objects) as the current time to the L1 determiner 111. The L1 determiner 111 determines that a booking time required by any app is night based on the fetched current time.

In operation 1110, the L1 determiner 111 associates the data object and app functions with the message content determined using internal mapping of the BII category and the message content for preparing the first list as shown in 1110A of the FIG. 11D, which is given in Table 4.

TABLE 4

| Object class | BII | Apps | App Function | data object | Mapped Messages |
|---|---|---|---|---|---|
| Family & Kids | Create call | Phone app | Make a video call | Mike, Grandma | Share a moment |
| | | Instant chat app | Make a video call | Mike, Grandma | Share a moment |
| | Get Offer | Shopping app | Find offers | Family & Kids, | Check offers |
| | Get Product | Shopping app | Order an item | Family & Kids | Want to Buy? |
| Cutlery | Order menu item | Food booking app | Order an item | Indian, Korean | Want to Order? |
| | Get reser-vation | Restaurant booking app | Check my reservations | Night | Check reser-vations? |
| Furniture | Get Product | Shopping app | Order an item | Furniture | Want to Buy? |
| Sports equipment | Get News article | News app | Search news | Sports equipment | Check News? |
| Pet | Get Product | Shopping app | Order an item | Dog | Want to Buy? |
| | Get Thing | Event booking app | Look for events | Dog | Search an event? |

In operation 1111, the L1 determiner 111 prepares the first list 1111A using the app icon, object class, and the message content as given in Table 5.

TABLE 5

| Object class | Message with function | App Icon |
|---|---|---|
| Family & Kids | Share a moment with Mike | Phone app |
| | Share a moment with Mike | Instant chat app |
| | Share a moment with Grandma | Phone app |
| | Share a moment with Grandma | Instant chat app |
| | Check offers for family and kids? | Shopping app |
| | Want to buy for family and kids? | Shopping app |
| Cutlery | Check reservations for Night? | Restaurant booking app |
| | Want to Order Indian Cuisine? | Food booking app |
| | Want to Order Korean Cuisine? | Food booking app |
| Furniture | Want to Buy Furniture? | Shopping app |
| Sports equipment | Check Sports News? | News app |
| Pet | Want to Buy Dog Products? | Shopping app |
| | Search an event for Dog | Event booking app |

Figure 11A:
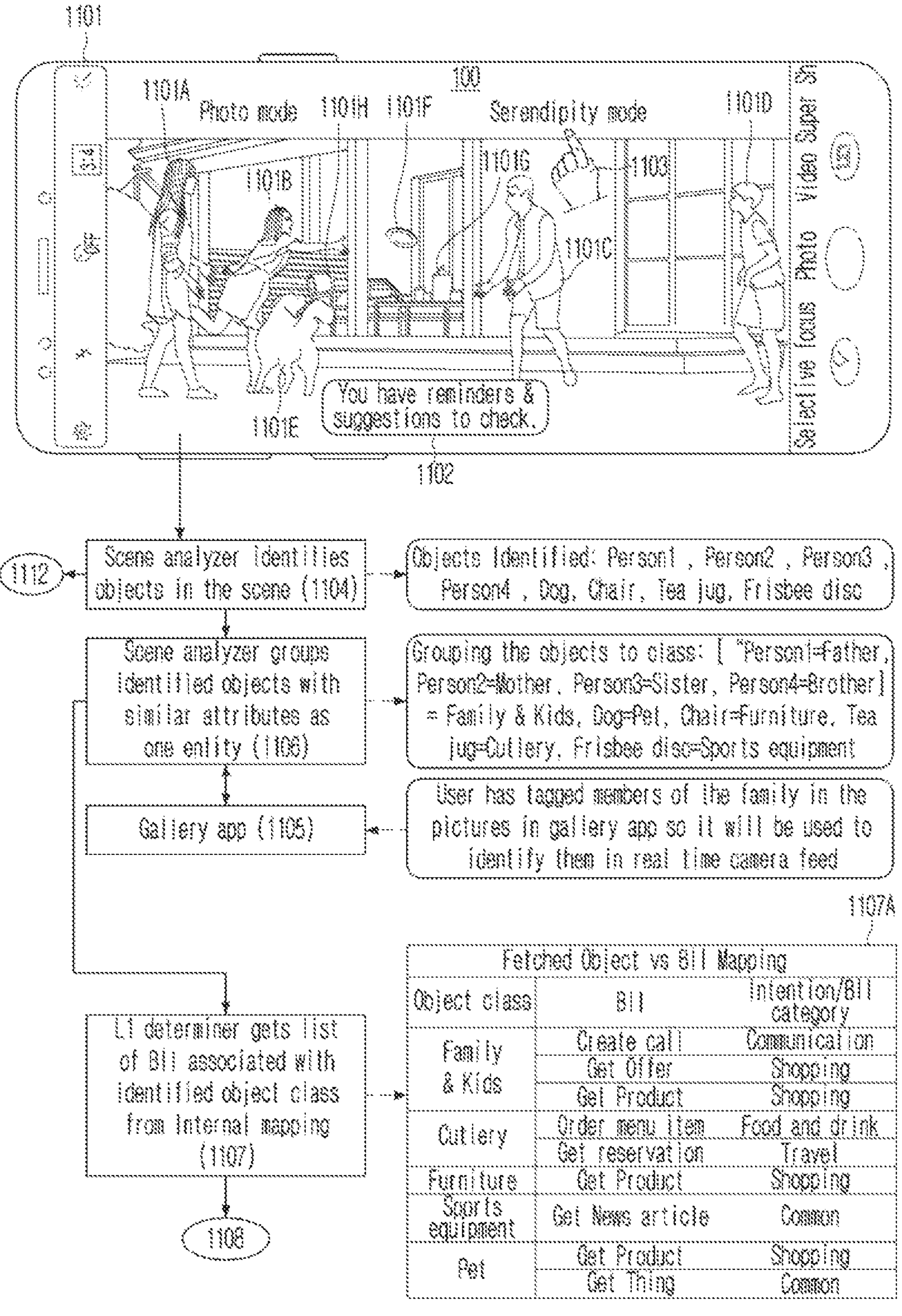
Figure 11E:
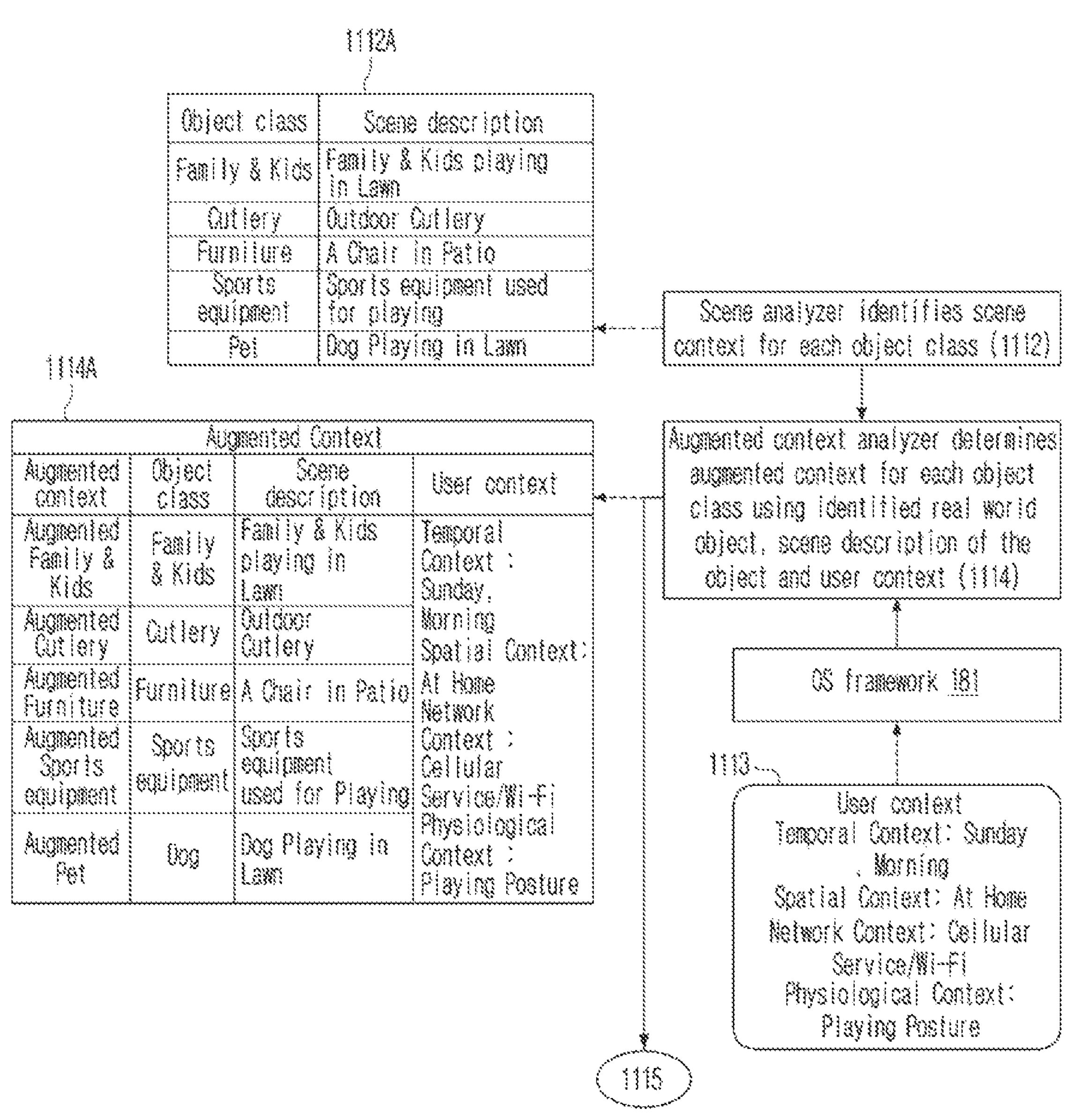

In operation 1112, the scene analyzer 150 identifies the scene context for each of the object class that contains the identified objects and the scene description, as shown in 1112A of the FIG. 11E, which is given in Table 6.

TABLE 6

| Object class | Scene description |
|---|---|
| Family & Kids | Family & Kids playing in Lawn |
| Cutlery | Outdoor Cutlery |
| Furniture | A Chair in Patio |
| Sports equipment | Sports equipment used for playing |
| Pet | Dog Playing in Lawn |

In operation 1113, the OS framework 181 determines the user context includes the temporal context as Sunday and morning, the spatial context: as home, the network context as cellular service, and the physiological context as playing posture. Further, the OS framework 181 provides the user context to the augmented context analyzer 112. In operation 1114, the augmented context analyzer 112 determines the augmented context for each identified object using the identified real world object, the scene description of the object in the scene context and the user context, as shown in 1114A, which is given in Table 7.

TABLE 7

| Augmented context | Object class | Scene description | User context |
|---|---|---|---|
| Augmented Family & Kids | Family & Kids | Family & Kids playing in Lawn | Temporal Context: Sunday, Morning Spatial Context: At Home Network Context: Cellular Service/ Wi-Fi Physiological Context: Playing Posture |
| Augmented Cutlery | Cutlery | Outdoor Cutlery | |
| Augmented Furniture | Furniture | A Chair in Patio | |
| Augmented Sports equipment | Sports equipment | Sports equipment used for Playing | |
| Augmented Pet | Dog | Dog Playing in Lawn | |

Figure 11F:
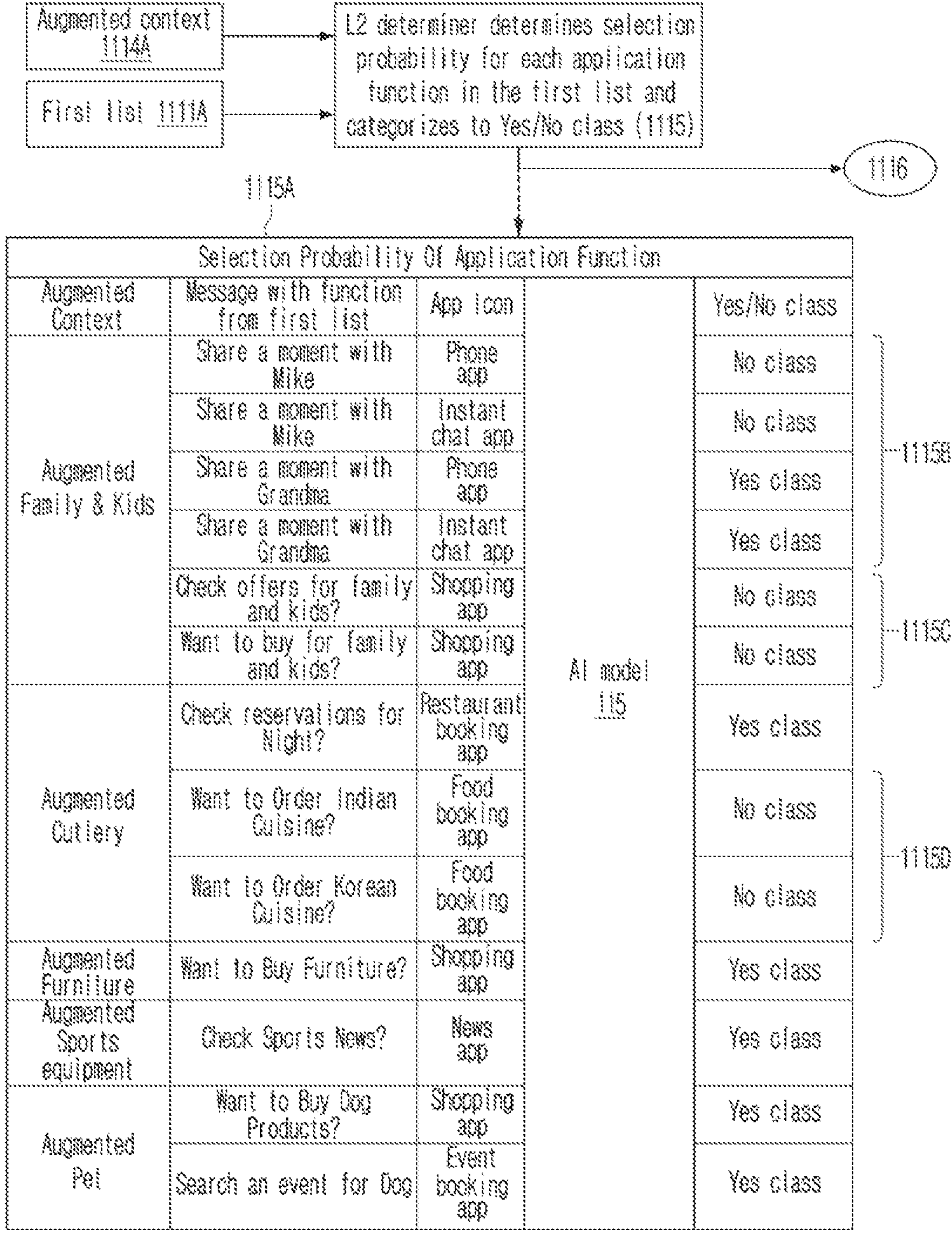

In operation 1115, the L2 determiner 114 determines the selection probability for each application function in the first list using the augmented context 1114A and the first list 1111A and categorizes to Yes/No class using the AI model 115 as shown in 1115A of the FIG. 11F, which is given in Table 8.

TABLE 8

| Augmented Context | Message with function from the first list | App Icon | AI model | Yes/No class |
|---|---|---|---|---|
| Augmented Family & Kids | Share a moment with Mike | Phone app | | No class |
| | Share a moment with Mike | Instant chat app | | No class |
| | Share a moment with Grandma | Phone app | | Yes class |
| | Share a moment with Grandma | Instant chat app | | Yes class |
| | Check offers for family and kids? | Shopping app | | No class |
| | Want to buy for family and kids? | Shopping app | | No class |
| Augmented Cutlery | Check reservations for Night? | Restaurant booking app | | Yes class |
| | Want to Order Indian Cuisine? | Food booking app | | No class |
| | Want to Order Korean Cuisine? | Food booking app | | No class |
| Augmented Furniture | Want to Buy Furniture? | Shopping app | | Yes class |
| Augmented Sports equipment | Check Sports News? | News app | | Yes class |
| Augmented Pet | Want to Buy Dog Products? | Shopping app | | Yes class |
| | Search an event for Dog | Event booking app | | Yes class |

In the case of the Yes/No class of 1115B, the AI model 115 is pre-trained to choose the data object "Grandma" with higher probability than the data object "Mike" when the real world object is "Family and Kids". So, the probability of the data object "Grandma" for the moment sharing is higher than the data object "Mike". Therefore, the L2 determiner 114 puts the application function linked to the data object "Grandma" to the Yes class and the application function linked to the data object "Mike" to the No class. In the case of the Yes/No class of 1115C, the AI model 115 is pre-trained to choose a low probability for "Get Offers" and "Buy Products" when the scene description in the scene context is "Family Playing in Lawn". Thus, the L2 determiner 114 puts the application function for shopping for "Family & Kids" into the No class. In the case of the Yes/No class of 1115D, the AI model 115 is pre-trained to choose the low probability for "Order Food" when the user temporal contextual information suggests that the current time is not a regular meal time (e.g. Breakfast time, Lunchtime, Dinner time, etc.). Thus, the L2 determiner 114 puts the application function for "Cutlery" into the No class.

Figure 11G:
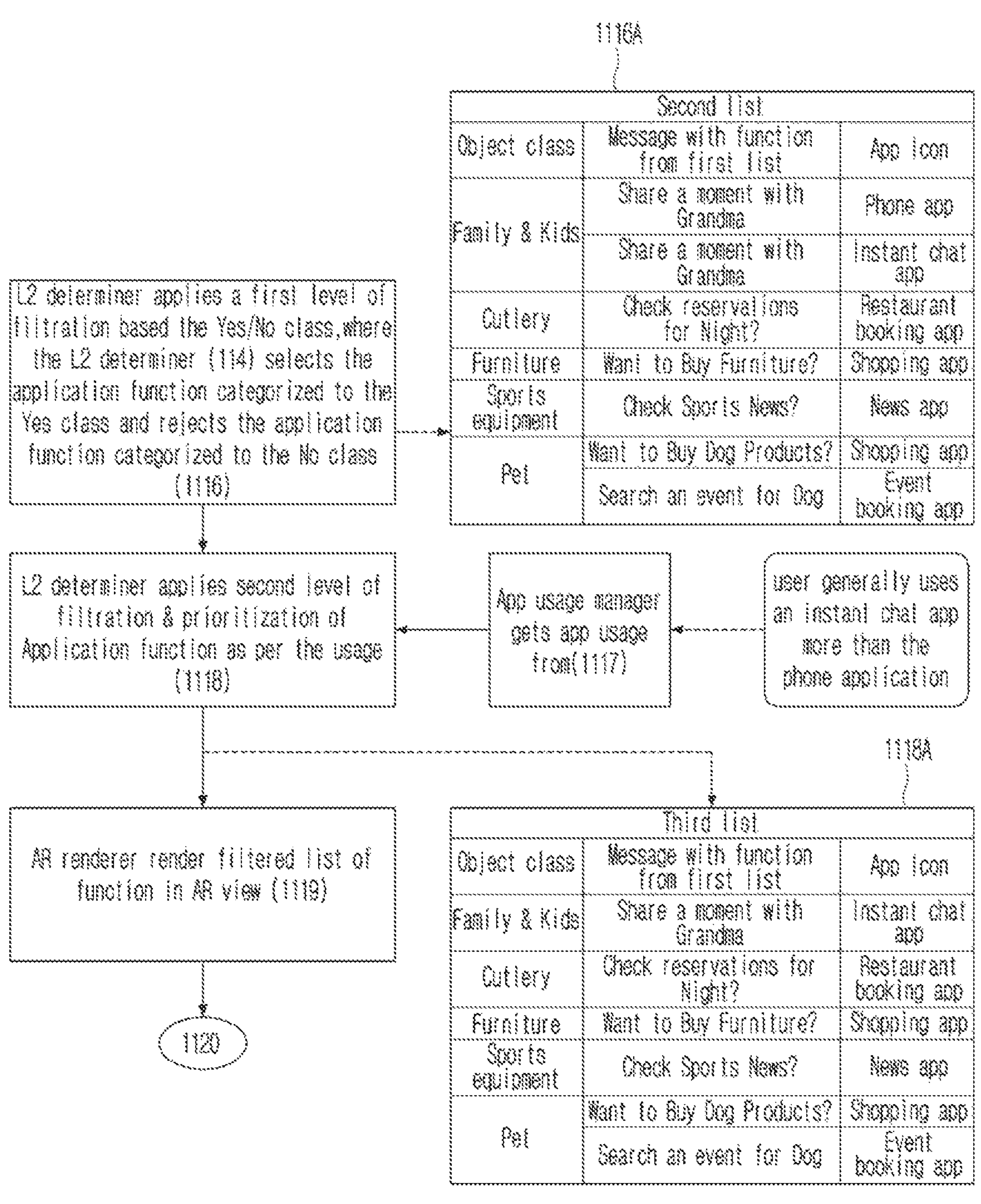

In operation 1116, the L2 determiner 114 generates the second list by applying a first level of filtration based on the Yes/No class, where the L2 determiner 114 selects the application function categorized to the Yes class and rejects the application function categorized to the No class as shown in 1116A of the FIG. 11G, which is given in Table 9.

TABLE 9

| Object class | Message with function from the first list | App Icon |
|---|---|---|
| Family & Kids | Share a moment with Grandma | Phone app |
| | Share a moment with Grandma | Instant chat app |
| Cutlery | Check reservations for Night? | Restaurant booking app |
| Furniture | Want to Buy Furniture? | Shopping app |
| Sports equipment | Check Sports News? | News app |
| Pet | Want to Buy Dog Products? | Shopping app |
| | Search an event for Dog | Event booking app |

In operation 1117, the app usage manager 185 provides the historical usage frequency of the functions of the application to the L2 determiner 114. For example, the app usage manager 185 communicates to the L2 determiner 114 that the user generally uses an instant chat app more than the phone application. In operation 1118, the L2 determiner 114 generates the third list by applying a second level of filtration based on the prioritization of the application functions as per the historical usage frequency of the functions the application as shown in 1118A, which is given in Table 10.

TABLE 10

| Object class | Message with function from the first list | App Icon |
|---|---|---|
| Family & Kids | Share a moment with Grandma | Instant chat app |
| Cutlery | Check reservations for Night? | Restaurant booking app |
| Furniture | Want to Buy Furniture? | Shopping app |
| Sports equipment | Check Sports News? | News app |
| Pet | Want to Buy Dog Products? | Shopping app |
| | Search an event for Dog | Event booking app |

Further, the L2 determiner 114 provides the third list of messages with the associated application functions to the AR renderer 160. In operation 1119, the AR renderer 160 renders each message with the associated application functions in the third list over the image for the AR view.

Figure 11H:
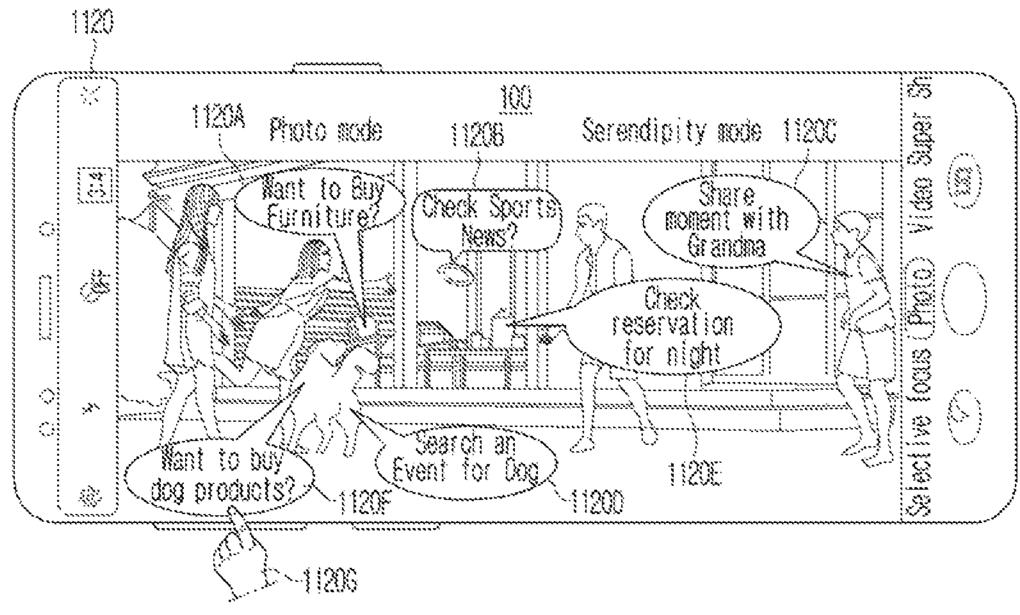
Figure 11H:
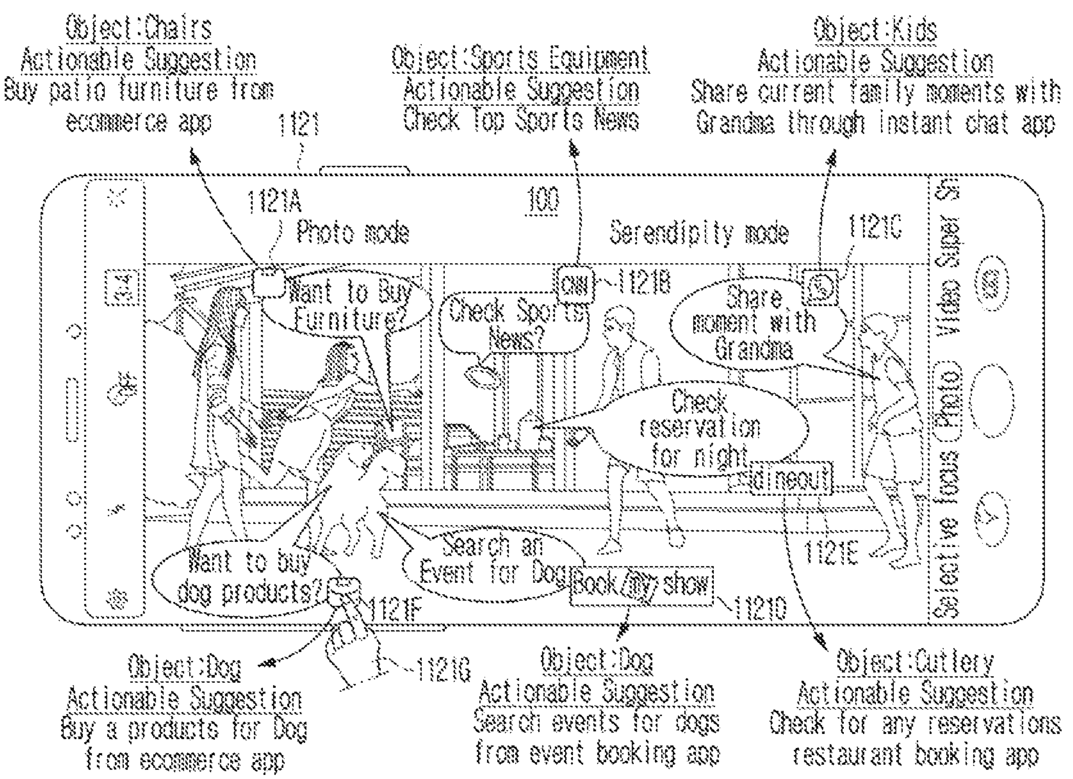

As shown in 1120 of the FIG. 11H, the electronic device 100 augments each message with the associated application functions near the objects in the image to which the message belongs. For, example, the message "Want to Buy Furniture?" 1120A is augmented near to the chair 1101H. The message "Check Sports News?" 1120B is augmented near to the frisbee disc 1101F. The message "Share a moment with Grandma" 1120C is augmented near to the brother 1101D. The message "Search an event for Dog" 1120D is augmented near to the dog 1101E. The message "Want to Buy Dog Products?" 1120F is augmented near to the dog 1101E. The message "Check reservations for Night?" 1120F is augmented near to the tea jug 1101G. At 1120G, the user has selected the message "Want to Buy Dog Products?" 1120F that is augmented near to the dog 1101E.

As shown in 1121 of the FIG. 11H, the electronic device 100 then blurs the image and displays the shopping app icon 1121F near to the message "Want to Buy Dog Products?" 1120F and becomes ready to execute the application function associated with the message "Want to Buy Dog Products?" 1120F. At 1121G, the user taps on the shopping app icon 1121F. Upon receiving the user input (e.g. tap) on the shopping app icon 1121F, the electronic device 100 executes the application function associated with the message "Want to Buy Dog Products?" 1120F for buying the dog products from the shopping app.

Similarly, when the user selects any other messages 1120A-1120E, the electronic device 100 displays the app icon 1121A-1121E respectively near to the selected message 1120A-1120E and becomes ready to execute the application function associated with the selected message 1120A-1120E. Upon receiving the user input (e.g. tap) on the app icon 1121A-1121E, the electronic device 100 executes the application function associated with the selected message 1120A-1120E as shown in 1121.

Figure 12:
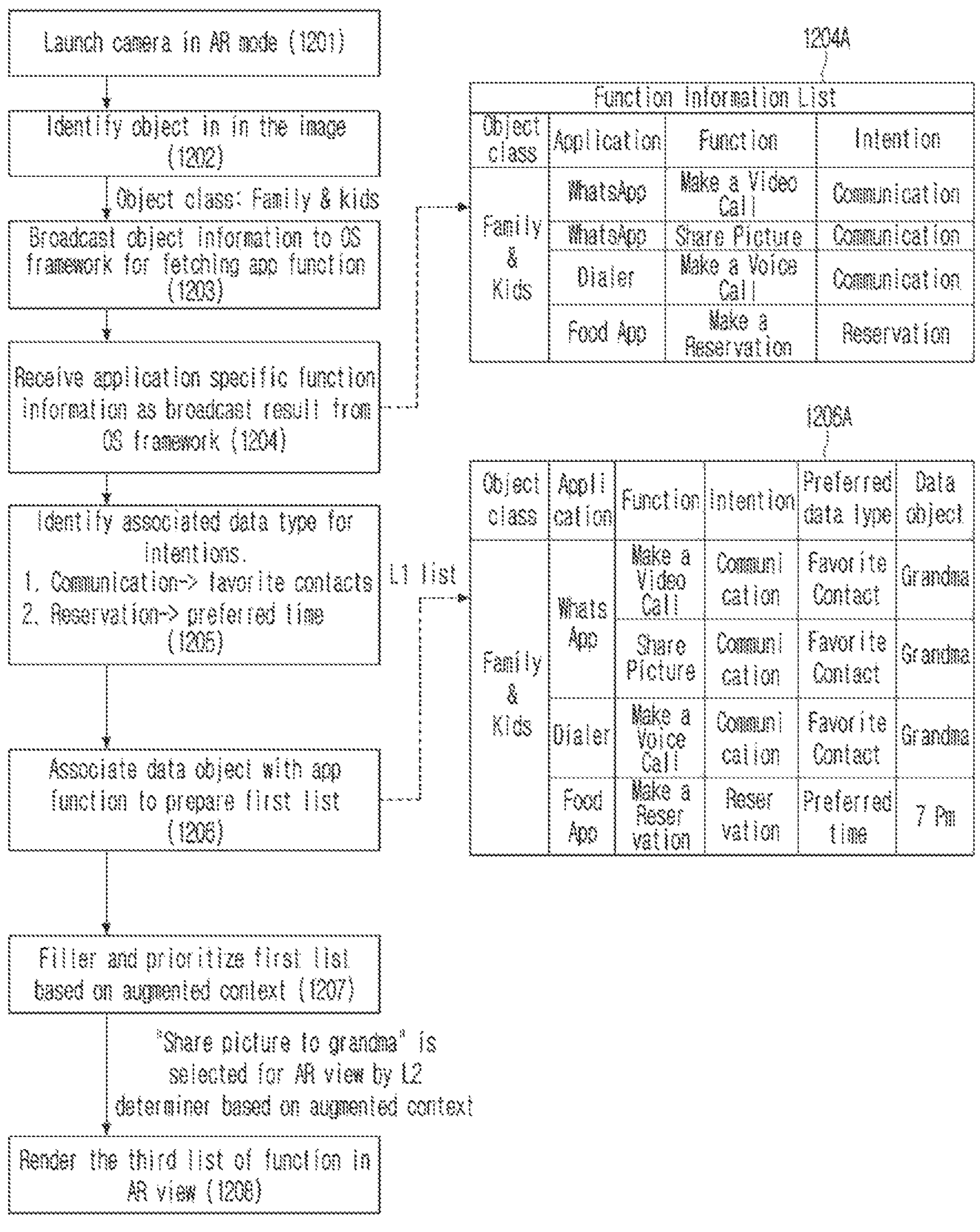
FIG. 12 is a diagram an example of providing the AR recommendations to the user based on an identifier of real world objects, according to an embodiment.

FIG. 12 is a diagram an example of providing the AR recommendations to the user based on an identifier of real world objects, according to an embodiment. In this exemplary embodiment, the applications installed in the electronic device 100 contain the predefine set of IDs of the objects. In operation 1201, the electronic device 100 launches the camera in the AR mode and watching preview of a scene includes the user's family members. The electronic device 100 displays the image of the scene for previewing the scene. In operation 1202, the electronic device 100 identifies the user's family members as the real world objects in the image. The electronic device 100 puts the family members of the user to the object class named Family & kids. In operation 1203, the electronic device 100 broadcasts the object ID linked to the predefine set of IDs to the OS framework 181 for fetching the app functions related to the object ID. In operation 1204, the electronic device 100 receives functions of the applications and the intention of each function as a result of the broadcast from the OS framework 181, which is given in Table 11 1204A.

TABLE 11

| Object class | Application | Function | Intention |
|---|---|---|---|
| Family & Kids | WhatsApp | Make a Video Call | Communication |
| | WhatsApp | Share Picture | Communication |
| | Dialer | Make a Voice Call | Communication |
| | Food App | Make a Reservation | Reservation |

In operation 1205, the electronic device 100 identifies the preferred data type linked to the intention of each function of the applications. For example, the favorite contact is the preferred data type linked to the intention "communication", whereas a preferred time is the preferred data type linked to the intention "reservation". In the example, the electronic device 100 identifies the phone number of grandma of the user as the favorite contact marked in the electronic device 100. Further, the electronic device 100 identifies that the time that the user preferred for reservation is generally 7 PM. In operation 1206, the electronic device 100 associates the data object (i.e. grandma, 7 PM) linked to the preferred data type for preparing the first list of messages as given in Table 1206A. Further, the electronic device 100 determines the augmented context based on the user context, the objects, and the scene context. In operation 1207, in response to generating the first list, the electronic device 100 follow further steps for generating the third list from the first list by filtering and prioritizing the function in the first list based on the augmented context. In the example, the electronic device 100 selects the message "Share picture to grandma" with the function for the AR view based on the augmented context to overlay near to one of the object in image. In operation 1208, the electronic device 100 renders the third list of the messages with function in the AR view.

FIGS. 13A, 13B, 13C, 13D, 13E, 13F, 13G, and 13H are diagrams of an example of providing the AR recommendations to the user based on the identifier of the real world objects, according to an embodiment. In this exemplary embodiment, the applications installed in the electronic device 100 contain the predefine set of IDs of the objects. The user may be viewing an image stored in the memory 120 using the gallery app in the electronic device 100 by operating the electronic device 100 in a gallery mode as shown in 1301 of the FIG. 13A. The image includes a scene of a lady 1302A reading a book 1302B in a room. A lamp 1302D, a flower pot 1302C and a window 1302E is also present in the scene. The electronic device 100 displays the image of the scene. The electronic device 100 overlays the notification window 1301A over the image to indicate the user whether the user want to see the AR recommendations. Further, the electronic device 100 displays the option "AR mode". In operation 1303, the user wishes to view the AR recommendations and hence the user taps on the option "AR mode". In response to receiving the tap input on the option "AR mode", the electronic device 100 detects that the user is interested to view the AR recommendations. Upon detecting that the user is interested to view the AR recommendations, the electronic device 100 identifies the objects includes the lady 1302A, the book 1302B, the flower pot 1302C, the lamp 1302D, and the window 1302E in the scene. In operation 1304 in the FIG. 13B, the electronic device 100 determines the object ID of the identified objects from the predefine set of object IDs as given in Table 12.

TABLE 12

| Object | Object ID |
|---|---|
| Lamp | 1 |
| Book | 2 |
| Lady | 3 |
| Flower pot | 4 |
| Window | 5 |

In operation 1305 in the FIG. 13C, the electronic device 100 fetches the application functions and data objects tagged to each object ID. As shown in the FIG. 13D, the electronic device 100 generates the first list of messages for each object class, where the object class and the object can be same. For example, the first list for the lamp 1306A includes app functions to change brightness level, pay electricity bill, and check to-do reminders. The first list for the book 1306B includes app functions to search eBook, get ticket for book fair, buy new book, renew subscription, and check to-do reminders. The first list for the lady 1306C includes app functions to book sun glasses order toys, buy new dress, book medical checkup, and check to-do reminders. The first list for the flower pot 1306D includes app functions to order seeds, order flowers, and check to-do reminders. The first list for the window 1306E includes app functions to book window painting, buy new curtains, book dry cleaning, open/close curtain, and check to-do reminders.

Further, the electronic device 100 determines the scene context as the "Lady reading the book in the room". Further, the electronic device 100 determines the user context includes the temporal context, the spatial context, the network context, and the physiological context. In the example, the temporal context is "Sunday at noon", the spatial context is "home location", the network context is "home wi-fi", the physiological context is "sitting posture". As shown in the FIG. 13E, electronic device 100 determines the augmented context of each object based on the scene context, the user context and the object ID. As shown in 1308 of the FIG. 13F, upon generating the first list for all the objects, the electronic device 100 determines the Yes/No class of each message with function in the first list using the AI model 115 as given in Table 13.

TABLE 13

| Augmented Context | Message with function from first list | AI Model | Yes/No class |
|---|---|---|---|
| Augmented Lamp | Change Brightness Level | | Yes class |
| | Pay Electricity Bill | | Yes class |
| | Check To-Do reminders | | No class |
| Augmented Book | Search eBook | | No class |
| | Get ticket for Book Fair | | Yes class |
| | Renew subscription | | Yes class |
| Augmented Flower Pot | Order Flowers | | Yes class |
| | Order Seeds | | No class |
| Augmented Lady | Book Sun Glasses | | No class |
| | Buy New dress | | No class |
| | Book Medical Checkup | | No class |
| Augmented Window | Book Window Painting | | No class |
| | Buy New Curtains | | Yes class |
| | Book Dry Cleaning | | No class |
| | Open/Close Curtain | | No class |
| | Check To-Do reminders | | No class |

As shown in 1309A, the electronic device 100 generates the second list by grouping the messages with application functions that is categorized to the Yes class. As shown in 1309B, the electronic device 100 sorts the messages with the application functions in the second list based on the priority of each messages with application function as per the usage of application function and generates the third list with the sorted messages with the application functions. Further, the L2 determiner 114 provides the third list of messages with the associated application functions to the AR renderer 160. Further, the AR renderer 160 renders each message with the associated application functions in the third list over the image for the AR view.

Figure 13A:
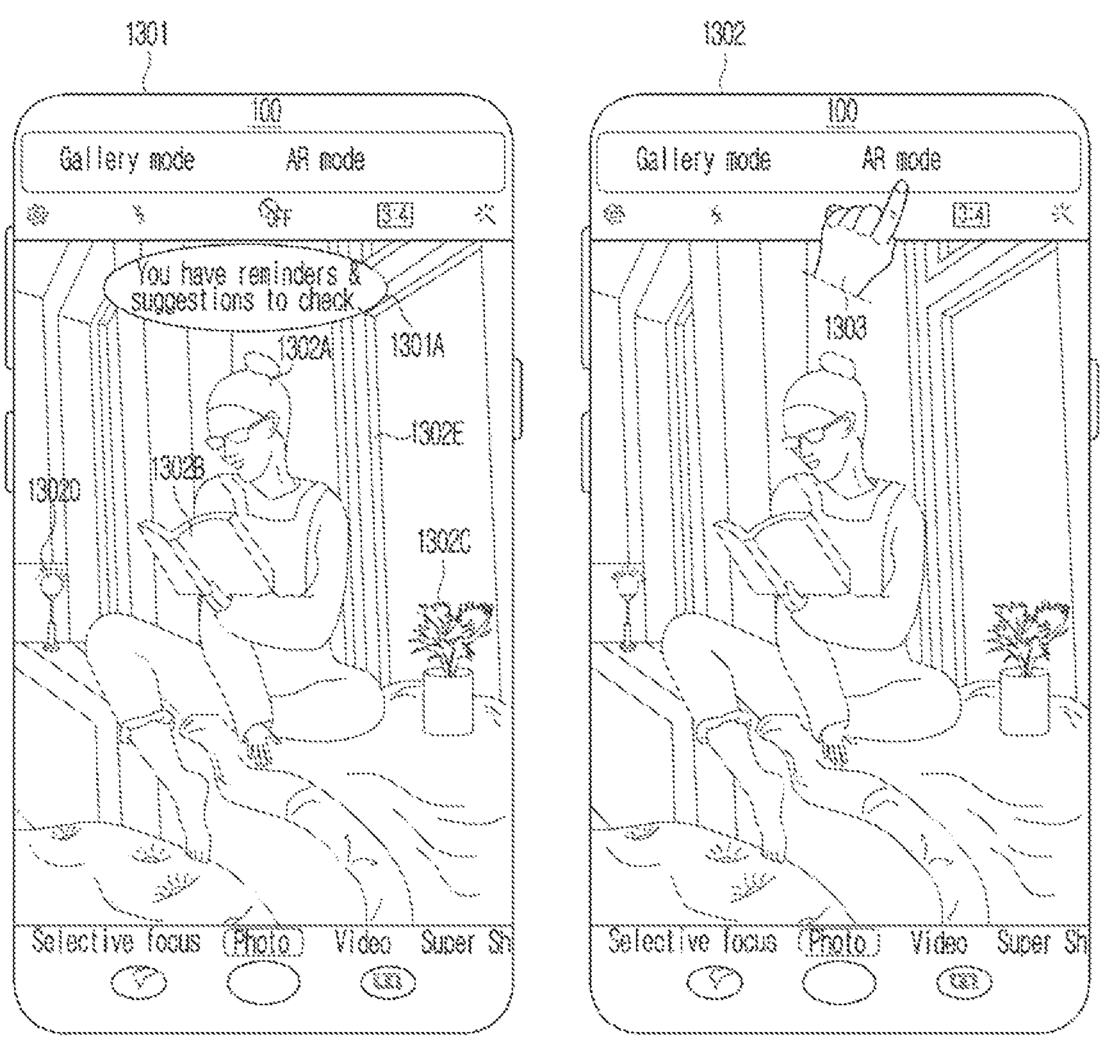
Figure 13D:
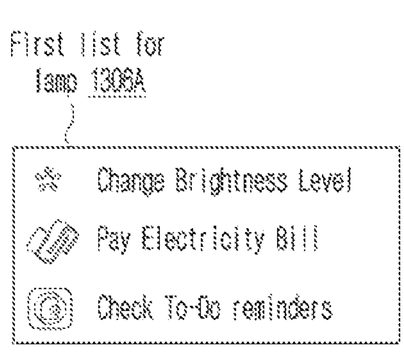
Figure 13D:
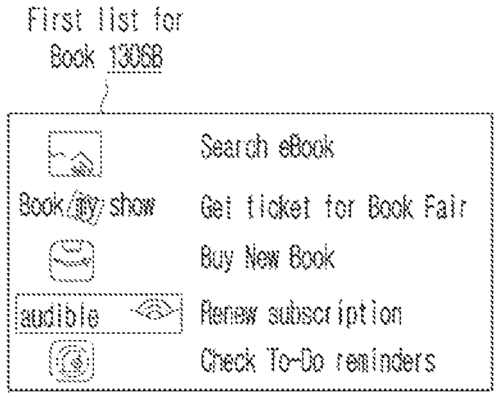
Figure 13D:
Figure 13D:
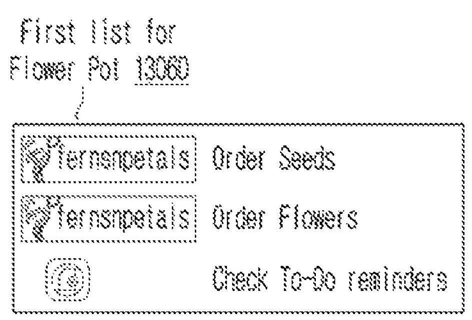
Figure 13D:
Figure 13E:
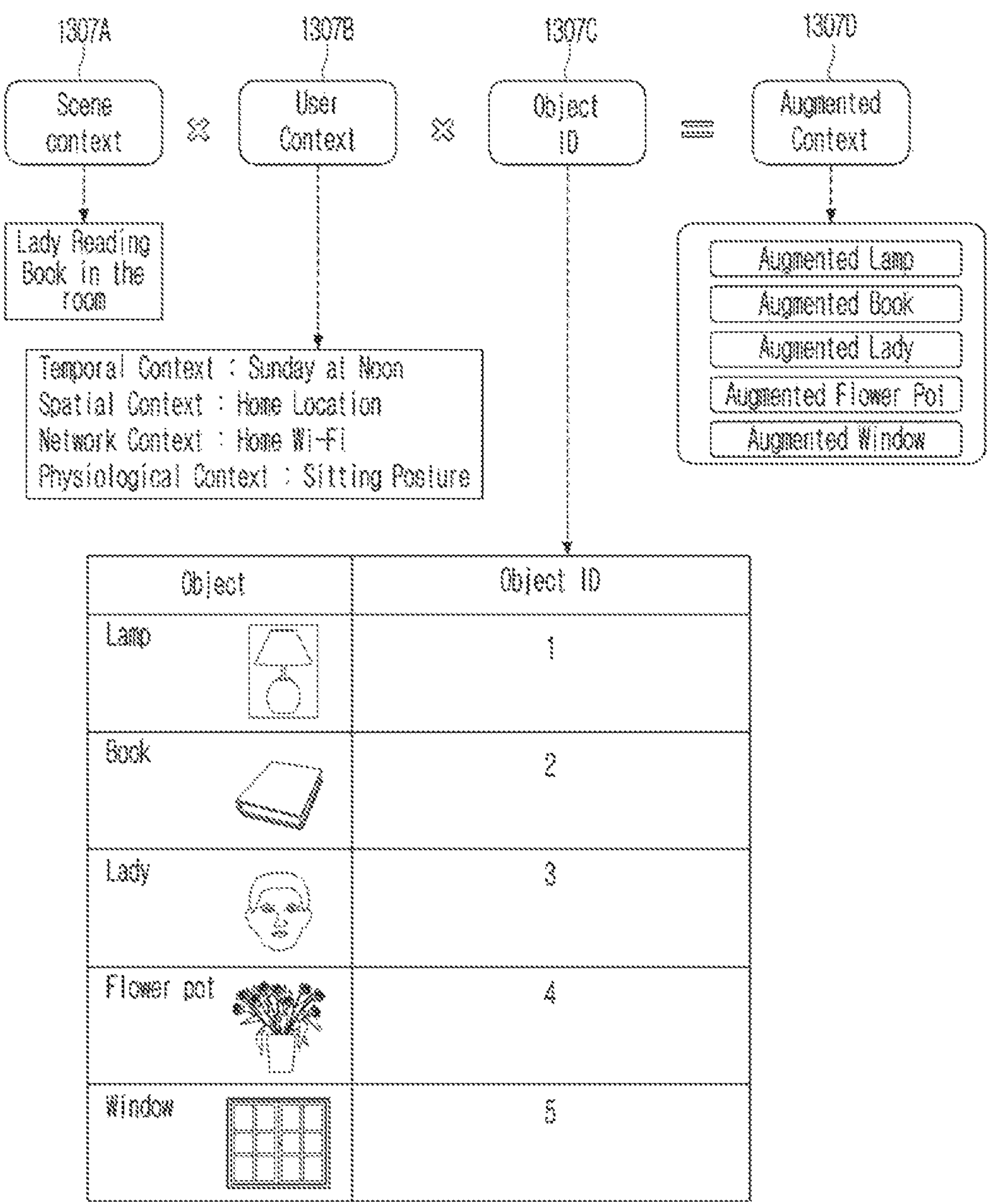
Figure 13G:
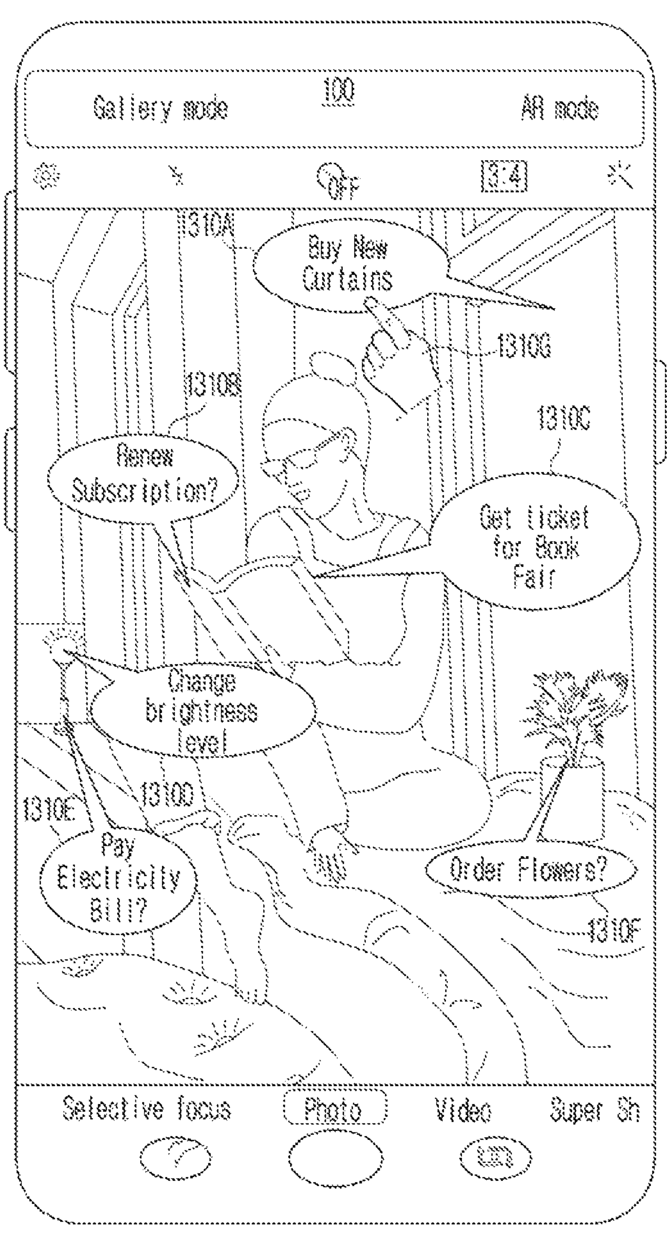

As shown in the FIG. 13G, the electronic device 100 augments each message with the associated application functions near the objects in the image to which the message belongs. For, example, the message "Change Brightness Level" 1310D is augmented near to the lamp. The message "Renew subscription" 1310B is augmented near to the book. The message "Pay Electricity Bill" 1310E is augmented near to the lamp. The message "Buy New Curtains" 1310A is augmented near to the window. The message "Order Flowers" 1310F is augmented near to the flower pot. The message "Get ticket for Book Fair" 1310C is augmented near to the book. In operation 1310G, the user may have selected the message "Buy New Curtains" 1310A that is augmented near to the window.

Figure 13H:
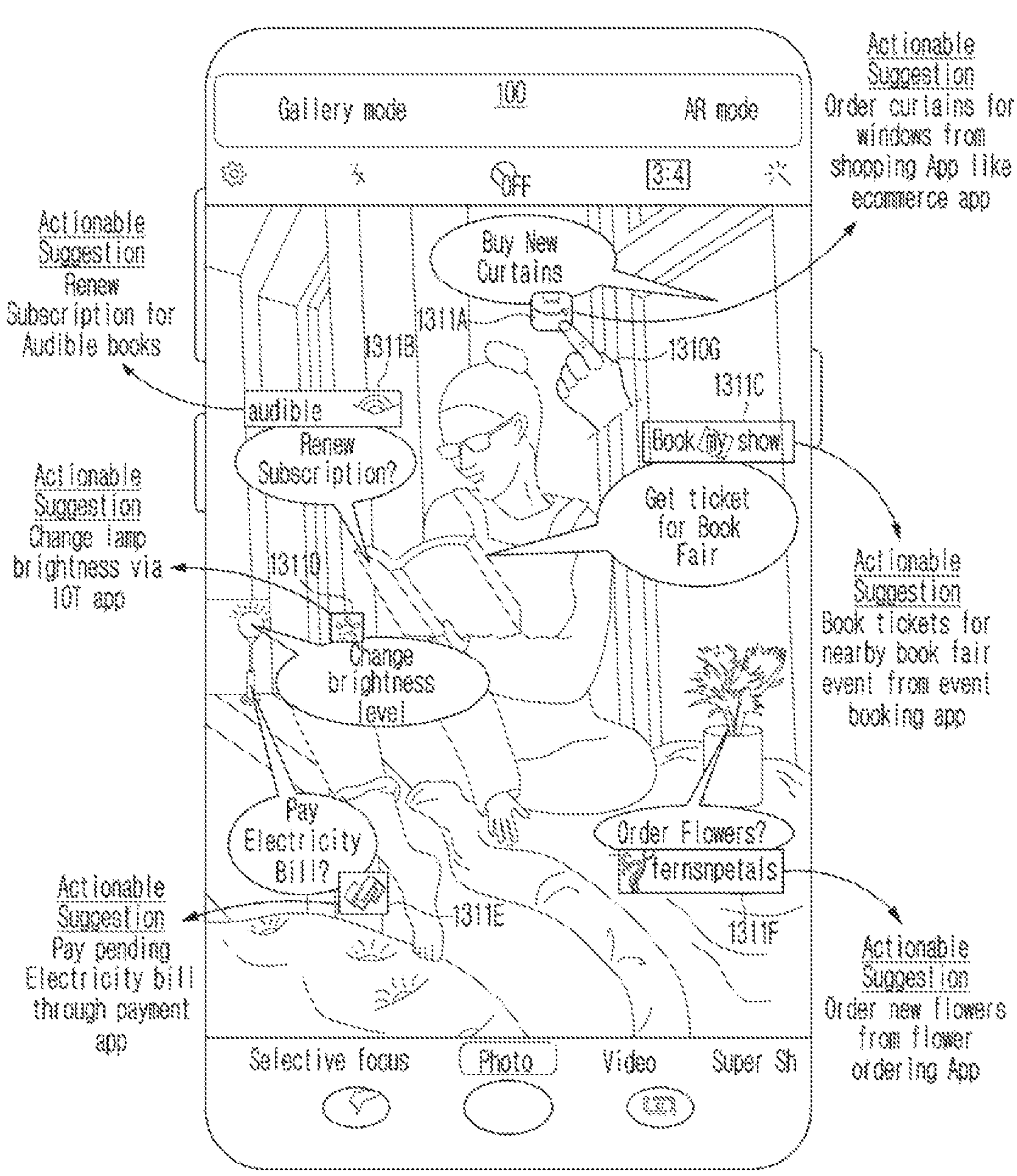

As shown in the FIG. 13H, the electronic device 100 then blurs the image and displays the shopping app icon 1311A near to the message "Buy New Curtains" 1310A and becomes ready to execute the application function associated to the message "Buy New Curtains" 1310A. At 1310G, the user taps on the shopping app icon 1311A. Upon receiving the user input (e.g. tap) on the shopping app icon 1311A, the electronic device 100 executes the application function associated with the message "Buy New Curtains" 1310A to buy new curtains for the window in the room from the shopping app.

Similarly, when the user selects any other messages 1310B-1310F, the electronic device 100 displays the app icon 1311B-1311F respectively near to the selected message 1310B-1310F and becomes ready to execute the application function associated to the selected message 1310B-1310F. Upon receiving the user input (e.g. tap) on the app icon 1311B-1311F, the electronic device 100 executes the application function associated with the selected message 1310B-1310F as shown in the FIG. 13H.

Figure 14A:
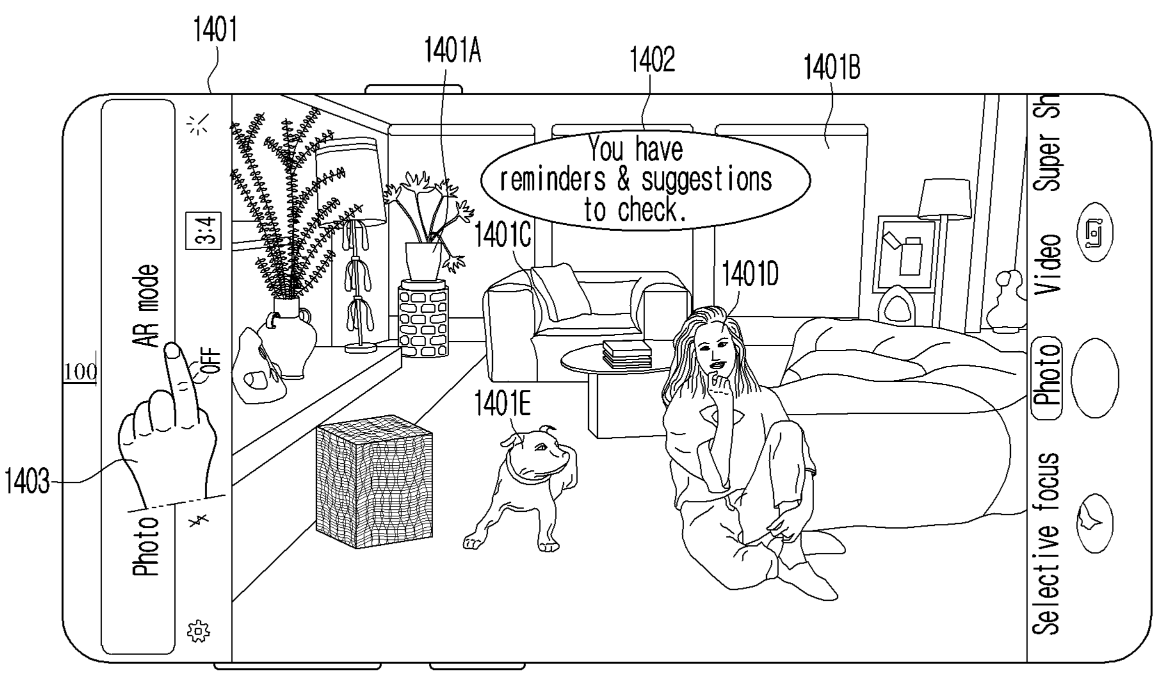
FIGS. 14A-14B are diagrams of an example scenario of providing the AR recommendations to the user based on identified real world objects in the image, according to an embodiment.
Figure 14A:
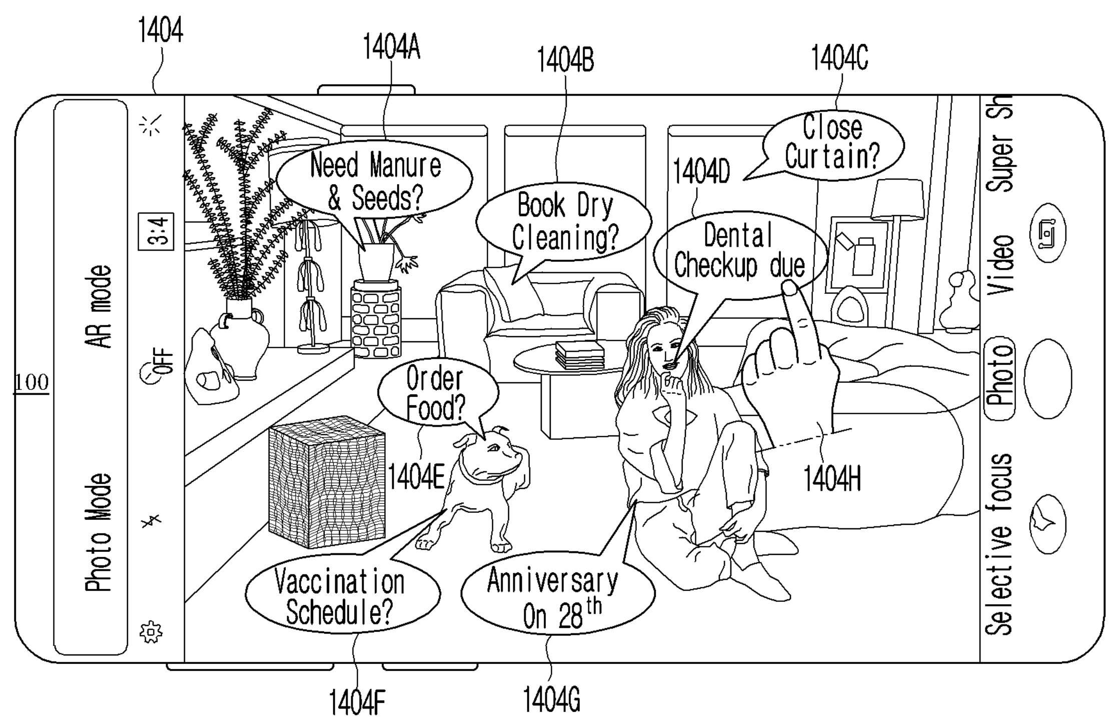
Figure 14B:
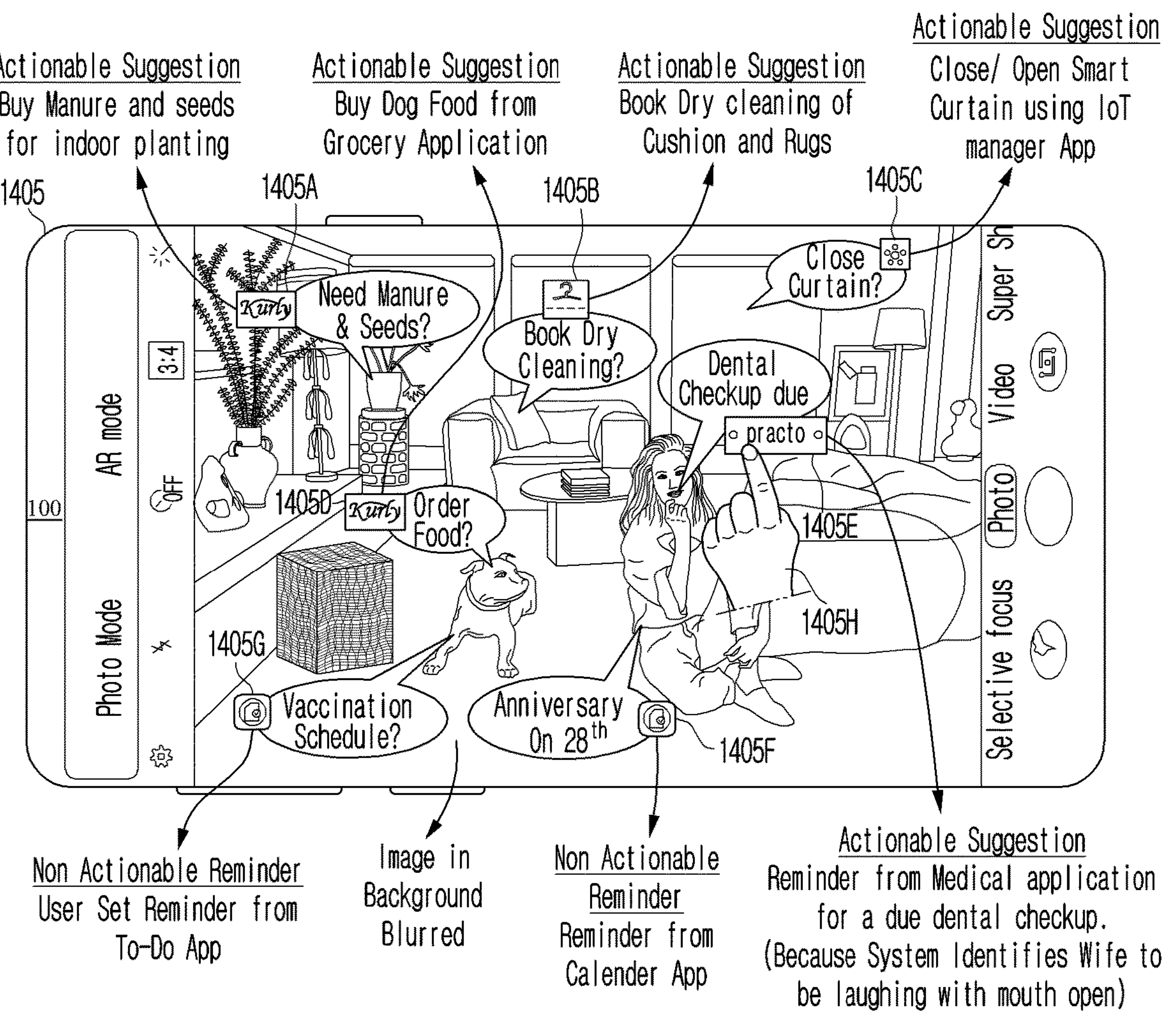

FIGS. 14A-14B are diagrams of an example scenario of providing the AR recommendations to the user based on identified real world objects in the image, according to an embodiment. In the example scenario, the user may be capturing the image of a scene of a room of a house using the camera of the electronic device 100 by operating the electronic device 100 in a photo mode. The image of the scene includes a wife 1401D who smiles in the image, a pet dog 1401E, an indoor plant 1401A, a window 1401B, and a sofa 1401C. The electronic device 100 displays the image of the scene as shown in 1401 of the FIG. 14A. The object mapping engine 110 overlays the notification window 1402 over the image to indicate the user whether the user wants to see the AR recommendations. Further, the object mapping engine 110 displays the option "AR mode". In operation 1403, the user wishes to view the AR recommendations, and hence the user taps on the option "AR mode". In response to receiving the tap input on the option "AR mode", the electronic device 100 detects that the user is interested to view the AR recommendations. In operation 1404, upon detecting that the user is interested to view the AR recommendations, the electronic device 100 identifies the real world objects in the image includes the smiling wife 1401D, the dog 1401E, the indoor plant 1401A, the window 1401B, and the sofa 1401C.

Using the proposed method, the electronic device 100 determines the third list of messages with application functions suitable to the identified real world objects 1401A-1401E. As shown in 1404, the electronic device 100 augments each message with the associated application functions in the third list of messages near the objects in the image to which the message belongs. For, example, the message "need manure and seeds?" 1404A is augmented near to the indoor plant 1401A. The message "Book dry cleaning?" 1404B is augmented near to the sofa 1401C. The message "close curtain" 1404C is augmented near to the window 1401B. The message "Dental checkup due" 1404D is augmented near to the smiling wife 1401D. The message "Order food?" 1404E is augmented near to the dog 1401E. The message "Vaccination schedule" 1404F) is augmented near to the dog 1401E. The message "Anniversary on 28th" 1404G) is augmented near to the smiling wife 1401D. In operation 1404H, the user may have selected the message "Dental checkup due" 1404D that is augmented near to the smiling wife 1401D.

As shown in 1405 of the FIG. 14B, the electronic device 100 then blurs the image and displays the doctor's appointment booking app icon 1405E near to the message "Dental checkup due" 1404D and becomes ready to execute the application function associated with the message "Dental checkup due" 1404D. In operation 1405H, the user taps on the doctor's appointment booking app icon 1405E. Upon receiving the user input (e.g. tap) on the doctor's appointment booking app icon 1405E, the electronic device 100 executes the application function (i.e. booking an appointment for the wife at the dental doctor for a checkup) associated with the message "Dental checkup due" 1404D.

Similarly, when the user selects any messages 1404A-1404G, the electronic device 100 displays the app icon 1405A-1405G respectively near to the selected message messages 1404A-1404G and becomes ready to execute the application function associated with the selected messages 1404A-1404G. Upon receiving the user input (e.g. tap) on the app icon 1405A-1405G, the electronic device 100 executes the application function associated with the selected message 1120A-1120E as shown in 1405.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for providing actionable content in an electronic device, the method comprising:

obtaining, by the electronic device, an image;

extracting, by the electronic device, scene information by analyzing a scene from the obtained image;

identifying, by the electronic device, at least one object from the scene information;

determining, by the electronic device, at least one scene description from the scene information and the at least one object;

determining, by the electronic device, a scene context based on the at least one object and the at least one scene description, wherein the scene context comprises activity related with the at least one object;

determining, by the electronic device, a user context including a temporal context or a network context;

displaying, by the electronic device, an augmented reality (AR) mode providing visual suggestion over the image;

identifying, by the electronic device, a user's input selecting the AR mode;

extracting, by the electronic device, a list of application functions based on the at least one object;

filtering, by the electronic device, application functions from the list of application functions based on the scene context and the user context;

prioritizing, by the electronic device, the filtered application functions based on a historical usage frequency of the filtered application functions;

displaying, by the electronic device, an interactive message corresponding to at least one of the prioritized application functions at a position corresponding to the at least one object;

receiving, by the electronic device, a user's selection on the displayed interactive message;

in response to receiving the user's selection on the displayed interactive message, displaying, by the electronic device and at a position corresponding to the interactive message, an application icon corresponding to an application configured to execute an application function corresponding to the displayed interactive message; and launching, by the electronic device, the application configured to execute the application function corresponding to the displayed interactive message based on a user's selection from the displayed application icon.

2. The method of claim 1, wherein the filtered application functions are arranged in a descending order of priority.

3. The method of claim 1, wherein filtering the application functions comprises:

generating, by the electronic device, at least one augmented context based on the scene context and the user context, wherein the at least one augmented context indicates an overall digital representation of the scene with respect to the at least one object in the scene and the user context while viewing the scene; and filtering, by the electronic device, the application functions from the list of application functions by applying the at least one augmented context to an artificial intelligence (AI) model.

4. The method of claim 1, wherein a size of the interactive message is varied based on a priority of the application function executed by the launched application.

5. A method for providing augmented reality (AR) recommendations to a user by an electronic device, comprising:

displaying, by the electronic device, an image on a screen of the electronic device;

identifying, by the electronic device, at least one real world object in the image;

determining, by the electronic device, at least one function of at least one application installed in the electronic device based on the at least one identified real world object;

augmenting, by the electronic device, the at least one function of the at least one application as an AR recommendation over the image, the AR recommendation comprising an interactive message corresponding to the at least one function and that is displayed at a position corresponding to the at least one real world object, receiving, by the electronic device, a selection of the displayed interactive message;

in response to receiving the selection of the displayed interactive message, displaying, by the electronic device, an application icon corresponding to the at least one application that is configured to execute at least one function corresponding to the interactive message; and executing, by the electronic device, the at least one application based on a selection of the displayed application icon.

6. The method of claim 5, wherein determining the at least one function of the at least one application installed in the electronic device comprises:

determining, by the electronic device, an identifier of the at least one identified real world object;

matching, by the electronic device, the identifier of the at least one identified real world object with a predefined set of identifiers embedded with the at least one application; and fetching, by the electronic device, the at least one function of the at least one application based on a match between the identifier of the at least one identified real world object and the predefined set of identifiers.

7. The method of claim 5, wherein augmenting the at least one function of the at least one application comprises:

classifying, by the electronic device, the at least one identified real world object to one or more object classes based on an attribute of the at least one identified real world object;

determining, by the electronic device, an intention of each function of the at least one application for each object class;

identifying, by the electronic device, a preferred data type linked to the intention of each function of the at least one application for each object class;

fetching, by the electronic device, data objects linked to the preferred data type;

fetching, by the electronic device, a message content mapped to each function of the at least one application;

generating, by the electronic device, a first list of messages with corresponding functions of the at least one application based on the mapped message content and the data objects for each object class;

determining, by the electronic device, a context of a scene in the image, wherein the context of the scene comprises an activity performed on each object class and an activity performed by each object class;

determining, by the electronic device, a context of the user of the electronic device in real time, wherein the context of the user comprises a temporal context, a spatial context, a network context, and a physiological context of the user;

generating, by the electronic device, at least one augmented context based on the context of the scene, and the context of the user for each object class, wherein the at least one augmented context indicates an overall digital representation of the scene with respect to the at least one real world object in the scene and the context of the user while viewing the scene;

filtering, by the electronic device, a second list of messages with corresponding functions of the at least one application from the first list of messages for each object class by applying the at least one augmented context to an artificial intelligence (AI) model;

determining, by the electronic device, a priority of functions of the at least one application corresponding to the second list of messages based on a historical usage frequency of the functions of the at least one application;

filtering, by the electronic device, a third list of messages with corresponding functions of the at least one application from the second list of messages for each object class based on the priority of the functions of the at least one application corresponding to the second list of messages; and augmenting, by the electronic device, each message in the third list of messages as the AR recommendation over the image, wherein the AR recommendation is configured to trigger a function associated with each message, wherein a size of the AR recommendation is varied based on the priority of the function associated with each message, and wherein a position of the AR recommendation is rendered based on the position of the at least one real world object in the image.

8. The method of claim 7, wherein generating at least one augmented context comprises:

generating, by the electronic device, hot encodings for the context of the scene, the context of the user and each object class; and determining, by the electronic device, an augmented context vector that represents the at least one augmented context by determining a cross product of the hot encodings.

9. The method of claim 7, wherein filtering the second list of messages comprises:

obtaining, by the electronic device, an augmented context vector that represents the at least one augmented context;

determining, by the electronic device, a probability vector for each function of the at least one application by providing the augmented context vector and the first list of messages to the AI model;

identifying, by the electronic device, the functions of the at least one application with the probability vector matches to a threshold condition; and generating, by the electronic device, the second list of messages with corresponding functions of the at least one application by sorting the identified functions of the at least one application with corresponding messages based on the probability vector.

10. An electronic device for providing augmented reality (AR) recommendations to a user, comprising:

a screen;

a memory storing instructions;

a processor configured to execute the instructions to:

display an image on the screen, identify at least one real world object in the image, determine at least one function of at least one application installed in the electronic device based on the at least one identified real world object;

augment the at least one function of the at least one application as an AR recommendation over the image, the AR recommendation comprising an interactive message corresponding to the at least one function and that is displayed at a position corresponding to the at least one real world object, receive a selection of the displayed interactive message;

in response to receiving the selection of the displayed interactive message, display an application icon corresponding to the at least one application that is configured to execute at least one function corresponding to the interactive message; and execute the at least one application based on a selection of the displayed application icon.

11. The electronic device of claim 10, wherein the processor is configured to execute the instructions to determine the at least one function of the at least one application installed in the electronic device by:

determining an identifier of the at least one identified real world object;

matching the identifier of the at least one identified real world object with a predefined set of identifiers embedded with the at least one application; and fetching the at least one function of the at least one application based on a match between the identifier of the at least one identified real world object and the predefined set of identifiers.

12. The electronic device of claim 10, wherein the processor is configured to execute the instructions to augment the at least one function of the at least one application by:

classifying the at least one identified real world object to one or more object classes based on an attribute of the at least one identified real world object;

determining an intention of each function of the at least one application for each object class; and identifying a preferred data type linked to the intention of each function of the at least one application for each object class.

13. The electronic device of claim 12, wherein the processor is further configured to execute the instructions to augment the at least one function of the at least one application by:

fetching data objects linked to the preferred data type;

fetching a message content mapped to each function of the at least one application;

generating a first list of messages with corresponding functions of the at least one application based on the mapped message content and the data objects for each object class;

determining a context of a scene in the image, wherein the context of the scene comprises an activity performed on each object class and an activity performed by each object class;

determining a context of the user of the electronic device in real time, wherein the context of the user comprises a temporal context, a spatial context, a network context, and a physiological context of the user;

generating at least one augmented context based on the context of the scene, and the context of the user for each object class, wherein the at least one augmented context indicates an overall digital representation of the scene with respect to the at least one real world object in the scene and the context of the user while viewing the scene;

filtering a second list of messages with corresponding functions of the at least one application from the first list of messages for each object class by applying the at least one augmented context to an artificial intelligence (AI) model;

determining a priority of functions of the at least one application corresponding to the second list of messages based on a historical usage frequency of the functions of the at least one application;

filtering a third list of messages with corresponding functions of the at least one application from the second list of messages for each object class based on the priority of the functions of the at least one application corresponding to the second list of messages; and augmenting each message in the third list of messages as the AR recommendation over the image, wherein the AR recommendation is configured to trigger a function associated with each message, wherein a size of the AR recommendation is varied based on the priority of the function associated with each message, and wherein a position of the AR recommendation is rendered based on the position of the at least one real world object in the image.

14. The electronic device of claim 13, wherein generating at least one augmented context comprises:

generating hot encodings for the context of the scene, the context of the user and each object class; and determining an augmented context vector that represents the at least one augmented context by determining a cross product of the hot encodings.

15. The electronic device of claim 13, wherein filtering the second list of messages comprises:

obtaining an augmented context vector that represents the at least one augmented context;

determining a probability vector for each function of the at least one application by providing the augmented context vector and the first list of messages to the AI model;

identifying the functions of the at least one application with the probability vector matches to a threshold condition; and generating the second list of messages with corresponding functions of the at least one application by sorting the identified functions of the at least one application with corresponding messages based on the probability vector.

* * * * *